(12) United States Patent
Clark et al.

(10) Patent No.: US 10,555,380 B2
(45) Date of Patent: Feb. 4, 2020

(54) SMART APPLIANCES, SYSTEMS AND METHODS

(71) Applicant: Inductive Intelligence, LLC, Ada, MI (US)

(72) Inventors: Gregory L. Clark, Ada, MI (US); David W. Baarman, Ada, MI (US)

(73) Assignee: Inductive Intelligence, LLC, Grand Rapids, MI (US)

( * ) Notice: Subject to any disclaimer, the term of this patent is extended or adjusted under 35 U.S.C. 154(b) by 0 days.

(21) Appl. No.: 15/939,203

(22) Filed: Mar. 28, 2018

(65) Prior Publication Data

US 2019/0104571 A1    Apr. 4, 2019

Related U.S. Application Data

(60) Provisional application No. 62/478,000, filed on Mar. 28, 2017.

(51) Int. Cl.

| | |
|---|---|
| H04M 1/00 | (2006.01) |
| H05B 6/06 | (2006.01) |
| H04M 1/725 | (2006.01) |
| H05B 6/12 | (2006.01) |
| A47J 36/24 | (2006.01) |
| G06K 7/10 | (2006.01) |

(Continued)

(52) U.S. Cl.
CPC .......... H05B 6/065 (2013.01); A47J 36/2466 (2013.01); G06K 7/10386 (2013.01); G06K 19/07758 (2013.01); H04M 1/7253 (2013.01); H05B 6/1209 (2013.01); A47J 36/2472 (2013.01); G06K 7/1417 (2013.01)

(58) Field of Classification Search
CPC .... H05B 6/065; H05B 6/1209; H04M 1/7253
USPC ........................................ 455/556.1
See application file for complete search history.

(56) References Cited

U.S. PATENT DOCUMENTS

| | | |
|---|---|---|
| 2,912,336 A | 11/1959 | Perino |
| 3,662,150 A | 5/1972 | Hartung |
| 3,829,654 A | 8/1974 | Eisler |

(Continued)

FOREIGN PATENT DOCUMENTS

| | | |
|---|---|---|
| JP | 2016162279 A1 | 9/2016 |
| WO | WO201212408 A1 | 9/2012 |

OTHER PUBLICATIONS

International Search Report and Written Opinion of the International Search Authority in corresponding International Application No. PCT/US2018/024961, dated June 27, 2018, 10 pages.

(Continued)

*Primary Examiner* — April G Gonzales
(74) *Attorney, Agent, or Firm* — Warner Norcross + Judd LLP

(57) ABSTRACT

A smart inductive heating appliance includes an interface for interacting with a package intelligence and communication module on a smart package. The smart heating appliance may also detect and charge chargeable devices inductively. A number of data sets may be utilized to enhance control of heating/cooking and to enhance safety. A thermodynamic load profile of the package may include detailed data correlations established in a package testing step and utilized to control heating of the package as well as to validate and authenticate the package.

19 Claims, 21 Drawing Sheets

(51) Int. Cl.
*G06K 19/077* (2006.01)
*G06K 7/14* (2006.01)

(56) References Cited

U.S. PATENT DOCUMENTS

| | | | |
|---|---|---|---|
| 3,830,944 A | 8/1974 | Dimitriadis | |
| 6,953,919 B2 | 10/2005 | Clothier | |
| 7,080,593 B1 * | 7/2006 | Frankel | A47J 36/32 |
| | | | 99/326 |
| 7,096,221 B2 | 8/2006 | Nakano | |
| 9,027,840 B2 | 5/2015 | Baarman et al. | |
| 9,546,916 B1 * | 1/2017 | Crane | G01K 13/00 |
| 2002/0008632 A1 * | 1/2002 | Clothier | G06K 7/0008 |
| | | | 340/10.1 |
| 2002/0157411 A1 * | 10/2002 | Ishikawa | B65D 5/42 |
| | | | 62/231 |
| 2006/0213904 A1 * | 9/2006 | Kates | B65D 79/02 |
| | | | 219/702 |
| 2008/0130520 A1 * | 6/2008 | Ebrom | G06F 9/54 |
| | | | 370/254 |
| 2008/0174436 A1 * | 7/2008 | Landt | G06K 19/0704 |
| | | | 340/572.7 |
| 2009/0212919 A1 | 8/2009 | Selgrath et al. | |
| 2010/0000980 A1 * | 1/2010 | Popescu | A47J 36/20 |
| | | | 219/201 |
| 2010/0015313 A1 * | 1/2010 | Harris | F24C 7/08 |
| | | | 426/523 |
| 2010/0213187 A1 * | 8/2010 | Bandholz | H05B 6/6441 |
| | | | 219/506 |
| 2011/0022211 A1 * | 1/2011 | McIntyre | G06Q 50/12 |
| | | | 700/108 |
| 2014/0295822 A1 | 10/2014 | Koo et al. | |
| 2015/0242660 A1 * | 8/2015 | Baarman | G01F 23/20 |
| | | | 235/383 |
| 2015/0245421 A1 * | 8/2015 | Heczko | H05B 6/1245 |
| | | | 99/323.3 |
| 2016/0196739 A1 | 7/2016 | Naber et al. | |
| 2016/0295640 A1 * | 10/2016 | De Samber | F24C 7/087 |
| 2017/0013681 A1 | 1/2017 | Lee et al. | |
| 2019/0104572 A1 | 4/2019 | Clark et al. | |

OTHER PUBLICATIONS

International Search Report and Written Opinion of the International Search Authority in corresponding International Application No. PCT/US2018/024975, dated Jun. 26, 2018, 10 pages.

* cited by examiner

Heating & Safety Profile

Number of Steps 6  Ambient Starting Temp 70F  Altitude 1222  Popcorn 55.560KHz

| Steps | Command Function | Target Temp | | Material Probe Low | | Material Probe High | | Package Probe | | Time to Target | | Charge Surface Temp (End) | | Tag Temp (Target) | | Voltage | | Frequency | | Duty Cycle | Trajectory | Measured Power | |
|---|---|---|---|---|---|---|---|---|---|---|---|---|---|---|---|---|---|---|---|---|---|---|
| Step 1 | Test System | 90 | F | 94 | F | 75 | F | 82 | F | 5.5 | s | 86 | F | 90 | F | 165 | V | Test Seq | KHz | 50% | >-->+> Target | 32 | W |
| Step 2 | Heat | 340 | F | 352 | F | 333 | F | 340 | F | 236 | s | 110 | F | 340 | F | 165 | V | 55.56 | KHz | 100% | > Target | 64.5 | W |
| Step 3 | Hold heat | 340 | F | 352 | F | 333 | F | 340 | F | 26 | s | 140 | F | 340 | F | 165 | V | 55.56 | KHz | 100% | Hold Target | 64.5 | W |
| Step 3 | Finish heat | 360 | F | 372 | F | 353 | F | 341 | F | 10 | s | 145 | F | 360 | F | 165 | V | 55.56 | KHz | 100% | < Next Target | 64.5 | W |
| Step 4 | Pause | 130 | F | 140 | F | 121 | F | 128 | F | 55 | s | 129 | F | 130 | F | 165 | V | 0 | KHz | 56% | Pause | 0 | W |
| Step 5 | Hold heat | 130 | F | 139 | F | 120 | F | 127 | F | 300 | s | 122 | F | 130 | F | 165 | V | 52.2 | KHz | 50% | Hold Target | 28.2 | W |
| Step 6 | Off | A | F | A | F | A | F | A | F | 0 | s | A | F | A | F | 165 | V | 0 | KHz | 0 | Off | 0 | W |
| | (1) | | | (9) | | (10) | | (11) | | (2) | | (3) | | (4) | | (5) | | (6) | | (7) | | (8) | |

*FIG. 3*

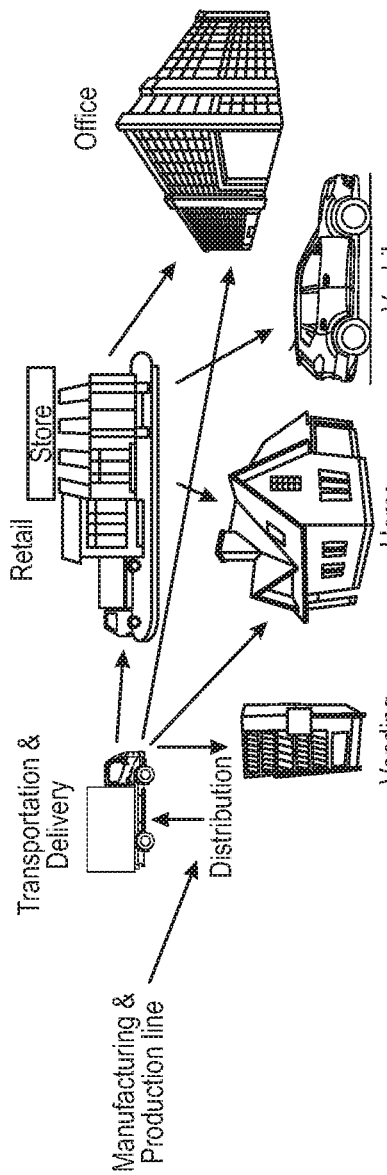

| Production | Distribution | Transportation | Retail | Home | Vending | Office | Automobile |
|---|---|---|---|---|---|---|---|
| Package Mfg date | Storage Start | Transport start | Retail arrival date / time | House location | Vending location | Office location | Automobile |
| Package Batch / Lot | Storage End | Transport stop | Price | House ID | Consumer ID | Office ID | Automobile ID |
| Testing Date & Version | Ship date/time | Transport Avg temp | purchase date | Consumer ID | Hours used | Consumer ID | Consumer ID |
| Manufacturing Start Date | Distribution Avg temp | Transport Max temp | SKU ID | Hours used | Hours on | Hours used | Hours used |
| Package Fill Date | Distribution Max temp | Transport Min temp | Retail ID | Hours on | Last product used | Hours on | Hours on |
| Manufacturing Finish Date | Distribution Min temp | Transportation ID | Counterfiet Code | Last product used | Top 10 products | Last product used | Last product used |
| Mfg Batch / Lot | Distribution ID | Counterfiet Code | | Top 10 products | Average time used | Top 10 products | Top 10 products |
| Sequence Steps | Counterfiet Code | | | Average time used | Top 10 Time of day usage | Average time used | Average time used |
| Formula Codes | | | | Top 10 Time of day usage | Installed date/time | Top 10 Time of day usage | Top 10 Time of day usage |
| Freshness date | | | | Installed date/time | Overall use accumulator | Installed date/time | Installed date/time |
| Use by Date | | | | Overall use accumulator | Overall Product counts | Overall use accumulator | Overall use accumulator |
| Reuse times | | | | Overall Product counts | Time of day buckets top 10 | Overall Product counts | Overall Product counts |
| production temp | | | | Time of day buckets top 10 | Expired products | Time of day buckets top 10 | Time of day buckets top 10 |
| production humidity | | | | Expired products | Expired list | Expired products | Expired products |
| Cooking Instructions | | | | Expired list | Reorder count | Expired list | Expired list |
| Time time / Intervals | | | | Reorder count | Reorder list | Reorder count | Reorder count |
| Target temperature | | | | Reorder list | Cooking instructions | Reorder list | Reorder list |
| Stir Times / Intervals | | | | Cooking instructions | Time time / Intervals | Cooking instructions | Cooking instructions |
| Load levels vs temp | | | | Time time / Intervals | Target temperature | Time time / Intervals | Time time / Intervals |
| Counterfiet Code | | | | Target temperature | Stir Times / Intervals | Target temperature | Target temperature |
| | | | | Stir Times / Intervals | Load levels vs temp | Stir Times / Intervals | Stir Times / Intervals |
| | | | | Load levels vs temp | Device ID | Load levels vs temp | Load levels vs temp |
| | | | | Device ID | Mobile ID's | Device ID | Device ID |
| | | | | Mobile ID's | Counterfiet Code | Mobile ID's | Mobile ID's |
| | | | | Counterfiet Code | | Counterfiet Code | Counterfiet Code |

FIG. 19

SMART APPLIANCES, SYSTEMS AND METHODS

PRIORITY CLAIM AND REFERENCE TO RELATED APPLICATIONS

This application claims priority and benefit under all applicable laws, treaties and regulations, to U.S. provisional application Ser. No. 62/478,000 filed on Mar. 28, 2017, titled "SMART PACKAGES AND SMART PACKAGE APPLIANCES," the subject matter of which is incorporated herein by reference in its entirety. Where an element or subject matter of this application or a part of the description, claims or drawings in the aforementioned provisional application is not otherwise contained in this application, that element, subject matter or part is incorporated by reference in this application for the purposes of any and all applicable rules, procedures or laws.

BACKGROUND

1. Technical Field

The disclosure relates to smart or intelligent appliances and systems and methods for transferring energy, such as by induction heating, to objects, including packages and packaged contents. Such contents may include consumable products, such as food products, beverages, liquids or liquefiable materials, cosmetic products and personal care products. Such objects may also include non-consumable objects, such as rechargeable devices, such as mobile phones. The terms "smart" or "intelligent" as used herein may refer to information storage, processing and communication features and capabilities that enhance operation and enable interfacing with users and with other devices, such as smartphones or external computers. Such appliances may include induction heating stoves, cooktops, cookers and ranges. The disclosure also relates to smart packaging, which may also include elements and features to support information storage, processing and communication.

The disclosure also relates to devices, systems and methods for monitoring and controlling the heating experience of a package and/or its contents. Heating "experience" refers to the heating process undergone by a package and/or package contents during a heating operation. The disclosure also relates to control systems for ensuring that safety standards are adhered to during the heating process and that safety measures relating to post-heating consumption are followed (i.e., avoiding high temperature of food, beverages, cosmetics or personal care products that could injure a consumer). The disclosure further relates to systems for communicating and analyzing data and other information related to package heating and generated prior to use, during use and after use and or during heating.

The disclosure also relates to devices, systems and methods for validating the integrity of packages and packaged content, such as validating that a package is properly constructed and contains the proper amount of product prior to or during a heating operation. The disclosure also relates to devices, systems and methods for authenticating packages and packaged content, such as ensuring that a package and packaged content are genuine and truly originate from a known source or provider.

2. Prior Art

Energy transfer and heating or cooking appliances, such as induction cooking appliances, are generally well known in the prior art. Such systems involve a heating element that transfers energy, typically by induction, to a receptor or cooking vessel which ultimately results in heating of package contents. Moreover, automated cooking systems and packaging systems that utilize energy transfer components, such as microwave popcorn packaging with an internal heating element, are generally known. However, known energy transfer appliances, systems, packaging systems and automated control systems utilized with such systems suffer from a number of drawbacks.

For example, in the past automating cooking appliances do not adequately customize the appliance heating function to the requirements of the package contents. Known solutions rely on human operator input to set the programming for the heating appliance based on knowledge of what is to be heated, such as amount of content, water content, desired heating/cooking temperature, starting temperature, etc. All of these factors and others influence the heating/cooking process and the energy to be delivered to the package contents. For example, a present problem with induction cooking is that an induction range will apply the same process for energy transfer to heat any object that is conductive and is on a conductive surface, regardless of the specific heating requirements for the package contents or contents within a cooking vessel. In other words, any device that can be inductively heated will be heated. For example, in the past microwaves may typically use 1500 watts to heat a small bag of popcorn, whereas the actual energy requirements for properly cooking the contents is only 60 watts. Thus, precise control of energy transfer, tailored to specific contents, offers the opportunity for dramatic energy savings. An additional drawback of the prior art is that known microwave packaging does not facilitate control to limit or adjust energy to compensate for foreign objects in the heating field, or to anticipate safety issues that may arise by heating unwanted objects in the field.

Other known issues with previous solutions are that they are not automated and controlled based on specific contents, and they do not limit the risk of unattended usage appropriately. Enabling the additional understanding by an appliance of package safety limits, experience set points, user set points and to deliver a controlled heating/cooking experience for packages and contents would vastly improve known appliances. An example of this is cooking in a metal pan with an inductive range. The type, amount and condition of ingredients used create variables to the cooking process undergone by the ingredients—the cooking experience. Unless they are exactly measured and exactly the same, the cooking experience will vary by some degree. Thus, determining and understanding the energy requirements of a particular product package and package contents and efficiently controlling cooking energy has been a challenge.

Another issue with prior art solutions relates to the lack of adequate package/product validation—the ability to determine whether or not a package and contents have an assumed level of integrity. And still another issue relates to the lack of adequate package/product authentication—the ability to determine whether or not a package and contents truly originate from a legitimate and known source. Package validation and authentication may be vital to verifying the operational and functional characteristics of a package to be heated. Such verification can be important if improved operation, such as support for unattended or remote operation of a heating appliance to heat a package is to be provided. Some prior art solutions control heating based on sensing parameters. For example, some prior art solutions may control heating based on a change in impedance in heated materials. For further example, other solutions, such as those provided by Hestan Cue, include smart cooking systems in which temperature and time of a cooking pan may be automatically set. However, such systems do not control based on a predefined or pre-modeled thermodynamic load of a heated package and suffer from a number of other shortcomings and disadvantages.

SUMMARY

Aspects of the disclosure provide smart appliances that operate on, or in conjunction with, smart packaging to facilitate improved control of energy delivered to package contents and improved efficiency and safety of the heating operation experienced by the package and package contents. The smart packaging may include a package intelligence and communication module (PICM), which may include a machine-readable element, such as a light-energized microtransponder, that can store and transmit a unique identifier, such as an electronic serial number (ESN), that may be pre-associated with a particular smart package and contents, and/or an instance thereof (i.e. a certain one of a type of smart package). The smart appliance may include an energizing unit for applying energy to the package contents; a package interface for interacting with the package intelligence and communication module, the package interface including: a transmitter for transmitting a signal to the package intelligence and communication module; and a receiver for receiving the package-content related data; the energizing unit including a control subsystem, including a processor for controlling the energy applied to the package contents based on the content-related data.

According to an aspect of the disclosure, the smart package may include a light-energized microtransponder (LEM) which is a small, radio-responsive microtransponder communication chip, such as microtransponders manufactured under the name P-CHIP® by Pharmaseq Corporation of Monmouth Junction, N.J., USA. The appliance may include a pulsed laser to power the microtransponder, as well as suitable structure to ensure line-of-sight of the laser to the microtransponder on any packages utilized with the appliance. The appliance may include an integrated P-CHIP® reader, which reads the information from the smart packaging and permits a control system to provide appropriate control of the cooking process to provide safe and efficient heating. Aspects of the disclosure enable a new level of control of energy delivered to contents, such as food, beverages, or cosmetics or personal care products and an improved heating experience delivered to the package and contents and for users.

According to another aspect, example appliances may utilize data sets associated with a unique product identifier and thus the smart package and contents to control package heating operations and to validate and authenticate packages. The data sets may be stored on a PICM or retrieved from local or remote databases in a wide area network (i.e., cloud) based on a unique package identifier obtained from a reader on the appliance. The data sets may include respective thermodynamic load profiles ("TLP's") for different packages to be heated. The TLP's may include data representing correlations of thermodynamic and other parameters established during a previous manufacturing, calibration or testing step. The TLP may correlate data representing, for example, frequency and field voltage related to mutual inductance, current related to power such as the voltage and current at a frequency related to the expected information provided by and read from the package over a specific time sequence. Because the package has specific formulations that can be repeated and filled within a know package with specific accuracies this information can be predefined, pre-configured and characterized providing specific and repeatable experiences. The retrieved information may be used to inform control systems on the appliance, and according to other aspects of the disclosure, to provide an improved cooking/heating process for the package contents. Power consumption of heating appliances may be reduced thru more efficient and precise control of cooking operations. Data sets retrieved by the appliance over a wide area network or locally may be utilized to efficiently control or validate energy transfer operations. The data sets may include information regarding the energy response of the contents, including how the contents within the package or vessel respond to energy over time and for a range of ambient temperatures and conditions (altitude). For example, for food contents, such as oatmeal, requiring the addition of a liquid, such as water, the energy response of a package being heated can be compared to a stored normal response for a given ambient temperature. If, for example, the package temperature increases faster than the normal response, a determination can be made that insufficient water was added to the package and the user can be notified via a user-interface, such as a display on the appliance. In addition, the energy applied to the package can be limited to prevent unsafe conditions, such as package or content temperatures increasing to an unsafe level. It should also be noted that the limits and variations of the packaging manufacturer also become part of these parameters. If, for example, the packaging manufacturer has a best case 7% fill accuracy, that may be built into the thermodynamic profile as an error percentage.

According to another aspect, example appliances may perform both heating and charging operations as appropriate for an object interacting with the appliance. If a product package to be heated is detected by the appliance, based on received product-identifying information, a heating operation is performed by the appliance. If a chargeable object, such as a smartphone, is detected by the appliance, an inductive charging operation may be undertaken on the chargeable object. Example appliances may include logic circuitry and sensors to sense the presence of a chargeable device or a product cooking package. An inductive charging coil and circuitry that may inductively charge or power the rechargeable device.

According to another aspect, example appliances may include user interfaces for conveying information regarding a cooking (or charging) operation to a user. The user interfaces may include audio and/or visual aspects, such as voice recognition, voice response, and visual displays. The user interfaces may be dedicated user interfaces integrated into the appliance, or may be user interfaces of an associated device, such as a smartphone running an application that permits use of the smartphone interface (audio, visual, tactile) to control the appliance. For example, user interfaces may include a status bar that allows the user to see real time cooking information and time to complete a cooking operation. Cooking surface and internal package temperatures may also be displayed and controlled. This may allow multiple packages and devices to be controlled and synchronized to the same completion times. This allows the vegetables, starch and meat packages to be completed at the same time even if they have very different cooking times. This is accomplished by the calculation of start times by length of cooking time and syncing that timing sequence. Longest starts first then the next then the shortest cook time last all targeted to complete at the same time. If a monitored temperature exceeds a predetermined threshold, we can list the material limits and reference the present temp. An interface, which may be audio-visual and/or tactile, and may convey notifications of package heating status, including real-time package temperature, heating time, and safety limits on temperature, materials and time.

According to another aspect of the disclosure, example appliances may utilize product-identifying data on smart packaging to authenticate product packaging and contents and improve product and heating safety. Authentication may be improved by combining the product identifying data obtained from a product package with pre-stored actual performance criteria and operation data profiles. A manufacturer of the authentic food, food package other product can determine a precise heating/energy response profile for that specific product. The response from the appliance will be dependent upon the precise composition of the authentic food product. Databases may associate the smart package identifying information with parameters relating to authenticity, including the energy response, as well as parameters relating to product freshness and heating profiles, including profiles for various ambient conditions. The smart heating appliance may retrieve his information via network for a particular package serial number or other identifying information. The smart package identifying information read by the appliance may be used to authenticate the legitimacy and quality of the product, protect against counterfeit or substandard products, and ensure that any expiration date has not passed. For example, if a machine-readable tag, such as an RFID tag, is placed on a counterfeit or substandard product, appliances according to an aspect of the disclosure may detect this based on deviations of the heating profile of the counterfeit product compared to the profile known to be associated with a legitimate product and/or package.

To improve safety, the control system may sense any deviation, even a small deviation, and in response may cause a fault condition compared to specified operating parameters, which in turn will initiate suitable control steps, such as the shut off the heating power. A package design system is employed to measure and assure temperatures, measure power levels and offsets, recording and testing the package operating characteristics over usage. It is this test system used by the package manufacture that sets the experience criteria and logs the operating transforms and safety limits. By monitoring and controlling delivered cooking energy very closely, systems and packaging according to aspects of the disclosure may provide safe, preconfigured and controlled cooking/heating processes and cooking experiences for the user. Stored profiles may include temperature profiles (temperature over time) and may include minimal liquid temperature, maximum liquid temperature, ideal profile, max material safety profile (surface and package) time and temperature, stir times, altitude offsets and ambient temperature offsets. Material safety properties may change over time and based on the materials database these parameters may shift as additional knowledge is gained.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto. The following FIGURES, unless otherwise noted, depict example devices according to aspects of the disclosure.

FIG. 3 illustrates a data correlations in a thermodynamic load profile for controlling an example smart appliance.

FIG. 19 illustrates data sets for supply chain monitoring and analytics for a smart package and smart appliance.

DETAILED DESCRIPTION

Figure 1:
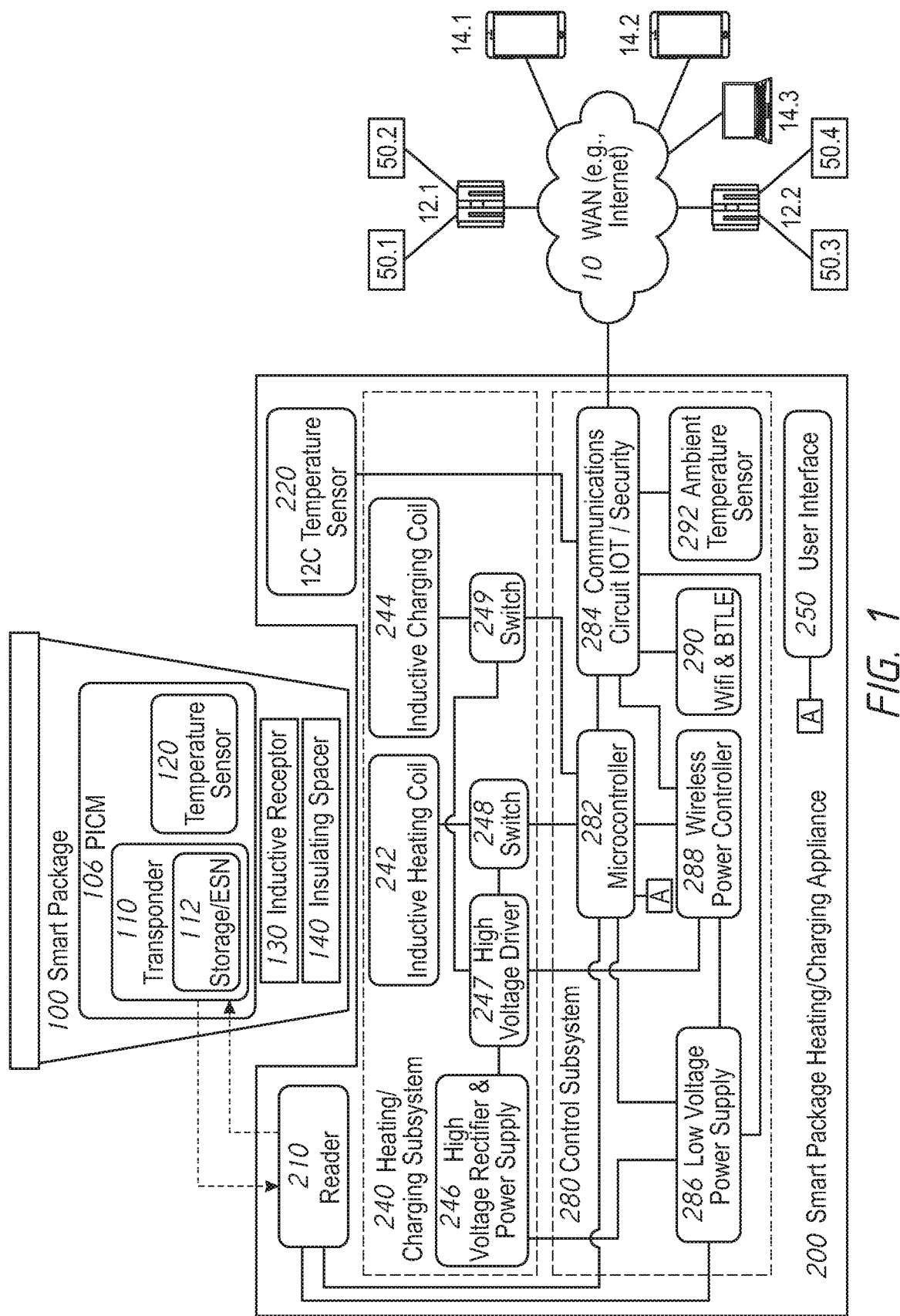
FIG. 1 is a block diagram of components and their functional relationships for a smart appliance and smart package.

FIG. 1 is a block diagram of example components and their functional relationships for an example smart appliance and smart package. The smart package 100 may be a sealed package, having a tamper-proof lid. The smart package 100 may include a package intelligence and communication module (PICM) 106, which may include a transponder 110 having a storage or memory 112 containing a stored unique identifier, such as an electronic serial number (ESN), and other data previously stored during a package manufacturing, test, calibration or initialization operation, as will be explained. A temperature sensor 120 may be disposed on or within the smart package 100. The smart package 100 may include an inductive receptor 130 and an insulating spacer 140 disposed therein.

According to an aspect of the disclosure, the transponder 110 may be a near-field communication element or tag, or more particularly, an electromagnetic energy (EME) energized RFID tag, or may be a light-energized microtransponder ("LEM"), such as the semiconductor product marketed under the name P-CHIP® by Pharmaseq, Inc., of Princeton, N.J. Such microtransponders have a small size, typically 500×500 microns and nominally 100 microns thick—and may include storage and store a unique serial number (ID) which is transmitted in response to energization of photocells on the microtransponder by received light, such as pulsed laser light. Light-energized microtransponders offer advantages over electromagnetic energy (EME) powered RFID tags, including lower cost, smaller size and elimination of interference from surrounding metal, such as packaging materials (i.e., metal cans). As such LEM's do not require a coil for generating power, their size is dramatically reduced compared to RFID tags and permits embedding or attachment of the microtransponder in or to packaging elements, such as container caps and package bottoms.

According to an aspect of the disclosure, LEM's, RFID or NFC tags, or any similar device with an inductive antenna or energy receiving element that generates current, can be used to harvest energy from an external source, such as from electromagnetic pulse energy received from a reader, and use the energy not only to power the transponder but to power other components in the system. For example, any excess power available from the inductive antenna can be used to additionally power other sensors in the system, such as sensors for pressure, temperature, tamper seals, and moisture sensors. The RFID or NFC chip harvests power and be configured in conjunction with a small microprocessor that may communicate with and control other components to deliver excess harvested power additional sensors. Energy may be stored in a small storage device integrated into the PICM 106. The use of extra available power harvested from the RFID or NFC components can be used to ensure other components, such as sensors, such as temperature sensor 120 of PICM 106, or other sensors, such as pressure sensors that may be included in a package and that require power, may operate more dependably and with the overall system having more stability than in cases where power available to the sensors is in short supply or interrupted. Temperature sensors may be used to control package heating according to preset thresholds, for example. Pressure sensors may be used to control a heating operation involving steaming and an internal package pressure. Components may communicate using known protocols or interface, such as I2C, also known as "I Squared C" is used interface to one or multiple sensors based on the required experience.

Still referring to FIG. 1, an example smart package heating and charging appliance (SPHCA) 200 may cooperate with the smart package 100 to heat the contents thereof. SPHCA 200 may include a reader 210 for communicating with the transponder 110 via radio-frequency. As will be explained further herein, the reader 210 may incorporate an optical simulator (pulsed laser) or an RF simulator to energize transponder 110. Transponder 110 may respond with an RF signal representing a unique identifier stored in storage 112 and other stored information. SPHCA may further include an integrated light harvesting circuit using an (I2C) interface and an I2C temperature sensor 220 for sensing heating surface temperature. SPHCA may include a heating/charging subsystem 240 and a control subsystem 280. In cases where a light source, such as laser, and a LEM or P-CHIP implementation is used, alignment for the SPHCA with the light source may be facilitated by locating the laser at the center of a circular recess for holding the package on the SPHCA 200 and placing the P-CHIP on the center of the circular bottom of package 100, as will be further detailed.

Heating/charging subsystem 240 may include one or more inductive heating coils 242 and an inductive charging coil 244. These coils may be integrated into a single unit, or separate, and are selectively energized by respective switches 248 and 249 and driven by a high voltage driver 247 which may receive rectified high voltage power from a power supply 246. Inductive heating coils 242 may be positioned to provide energy to the bottom and sides of a smart package 100 in order to provide rapid cooking times, as in the case where the SPHCA may be a hot food vending machine. The heating coil may be designed with Litz wire for lower ESR of about 0.131 ohms with 13 turns per layer and a Litz configuration of 5/40/42 for a 0.251" wire at a pitch of 0.002" for a 6.19 uf coil. Half or full bridge drivers are used to drive the coils configuration. High voltage and low voltage coils are designed for automotive and AC based systems. The initial system is designed for 19 VDC. It should be noted that this coil configuration can be adjusted work with lower and higher voltages and also using a switched external power supply for added consumer safety. The charging coil is a switched subset of the original heating coil or a power controlled and limited version of the actual heating coil. Power limiting for charging can be duty cycle control at a given charging frequency.

Heating/charging subsystem 240 and reader 210 are controlled by control subsystem 280, which may include a microcontroller 282 having a microprocessor, powered by a low voltage power supply 286. A wireless power controller 288 utilizes the microprocessor and a communications circuit to communicate to a wireless device when a wireless device is to be charged rather than a smart package heated. A Texas Instruments "bq" series wireless power transmitter, such as bq501210 or bqTESLA™ Wireless Power Transmitter or similar product may be used for the wireless power controller. The wireless power controller may utilize the Qi standard for wireless charging. It may also include authentication to determine whether or not the device is a registered product and whether or not the appliance is an approved product. As will be explained further, the control subsystem 280 and microcontroller 282 may determine whether a rechargeable device is present or a package is present. A "ping" may be used for to detect impedance changes and wake the system to start the identification process for an object placed on or in the appliance. The wireless power process starts first checking the proper impedance. If this meets the proper criteria of impedance a digital ping starts to identify the needs of the device to be charged. Then the charging process begins using the Qi standard where the device provides a target control point and the transmitter delivers and adjusts as required to meet the device demands.

According to aspects of the disclosure, power may be harvested using the RFID/NFC antenna. Using a rectifier, possibly an asynchronous rectifier and a tuned resonant frequency, energy may be harvested from the RFID tag and stored to power a microprocessor and switch capacitor network. The microcontroller 282 includes a microprocessor and includes logic to decide when to power the I2C interface and accessory based on available power.

A dedicated user interface 250 may be included on the SPHCA 200 and may be supported by microcontroller 282.

User interface 250 may include a visual output device, which may be a visual status bar on the appliance 200, and an audio output device, which may be a speaker for rendering simulated human voice responses, integrated into the appliance or standalone. User interface may also include one or more input devices for receiving input from a user, including a touchscreen interface, microphone and voice recognition support, which may be integrated into the appliance or in a standalone component communicating via WAN, and one or more pointing devices or pushbuttons. Communications interfaces are designed to exchange information and control with external control systems like home automation systems and external voice interfaces.

A communications circuit 284 provides communication and interfacing Internet of Things (TOT) and security/authentication, as well as other capabilities accessed over a wide area network 10. This connection may be utilized for appliance, package and device authentication. This adds an additional layer of safety in an attempt to eliminate counterfeit products, as will be explained. A number of database or web service servers, for example 12.1 and 12.2 may be accessed via WAN 10. These servers may store any number of data sets—four are shown by example—50.1, 50.1, 50.3 and 50.4 that include package or package-content related information. A number of user devices, for example, 14.1 and 14.2 may access database or web service servers and the SPHCA 200 via WAN 10. In addition, user devices 14.1 and 14.2 may store and execute one or more applications to enable interaction by a user with the SPHCA 200, either via the WAN 10 or via near field communication (NFC) technologies, such as Bluetooth.

According to an aspect of the disclosure, the storage 112 in the PICM 106 (FIG. 1) may include a product heating/cooking data set including parameters utilized by the control subsystem 280 to perform an optimal heating/cooking operation on the contents of package 100. An example product cooking data set may include: a start at ambient temperature, a first temperature set point and a holding temperature, then a time required to heat a product, such as a time to pop popcorn, then temperature corresponding to an "off" status. The start at ambient is the first temperature setpoint and required/expected energy to be used. The holding temperature is the temperature setpoint and required/expected energy, in a popcorn popping application, for example, may be required/expected energy to pop the corn within the hold time. Data representing the thermodynamic mass cooling over time based on the actual volume of the package and the given heat applied may be used to control operations, and energy may be supplemented during an operation to maximize the heating experience. Even in the off cycle the proper cool down may be specified as a package constraint. For example, a packaged food item may require that the contents of that package be heated to a temperature above the desired or specified temperature for consumption during the food preparation process. The package will continue to provide temperature data to the consumer even after the heating process is completed indicating when the package is safe to touch or the contents have cooled to the desired/pre-determined temperature for consumption. The product cooking data set may also include an optimal inductive receptor temperature, to which the heating operation is controlled, the receptor temperature is tracked as a predetermined and measured offset for that package using both the PCIM temperature and the surface temperature 220 offset by the 292 ambient sensors for receptor references and other parameters may be represented as parameters in the storage 112 (FIG. 1) and may be determined in a calibration and testing system during a package manufacturing operation done prior to the heating operation on the appliance.

According to aspects of the disclosure, data stored in storage 112, or retrieved from a remote database server 12.1, based on a product's unique identifier may include, without limitation, a stock-keeping unit (SKU) ID, product data (name, viscosity, specific gravity, % of liquid), package data (fill accuracy, change over time, altitude offsets, limits, base pressure), a target cooking temperature, encryption codes for an authentication step, a used/not used status indicator, production date, production batch and lot, data defining recommended stirring intervals, a maximum package temperature, expiration date, cooking instructions, a desired heating coil frequency, amplitude, power profile over temperatures (surface and RFID tag), ambient operating offsets, package and receptor temperature vs. time vs. temperature appliance vs time is stored as a transform function over time). The altitude and ambient temperature are stored as offsets to the transform function as seen in Table A. The receptor temperature is assumed based on measuring operating characteristics and storing the offsets of the surface temperature and package temperature.

The above operational data may be developed during a manufacturing step, where a package may be tested and calibrated for an optimal cooking operation a given experience. A manufacturer may use a test platform to perform a series of predetermined heating or heating related operations on a given package in order to determine the thermodynamic response characteristics. Data tracked, logged and/or acquired during this operation may include data representing placement of the package to be heated on the appliance, in various offsets, which may be physical offsets at 0.1" increments. Package response characteristics at each of these offsets may be determined. This data may be saved or associated with the particular package and stored as package offsets, temperature and power adjustments, expected ranges of operation and variations. These offsets, adjustments and variations are suitable modifiers to operational curves or correlated data representing package thermodynamic response characteristics. If a particular set of correlated data or operational curve is sensed by the system, the placement (i.e., centered or offset) of the package on the appliance can be determined and control parameters adjusted accordingly. This data is recorded and stored in the test equipment and may be reduced to more simple data curves or correlations (i.e., flat files with table data) for storage in the RFID tag or storage on a server in association with a unique identifier for the package. According to aspects of the disclosure, these operational parameters and control curves/correlations for that package may be utilized by the control subsystem 280 (FIG. 1) to control the cooking operation. Use of this data can thus provide a level of awareness and intelligence on the part of both the user and the appliance 200 that is improved compared to the prior art.

Figure 2:
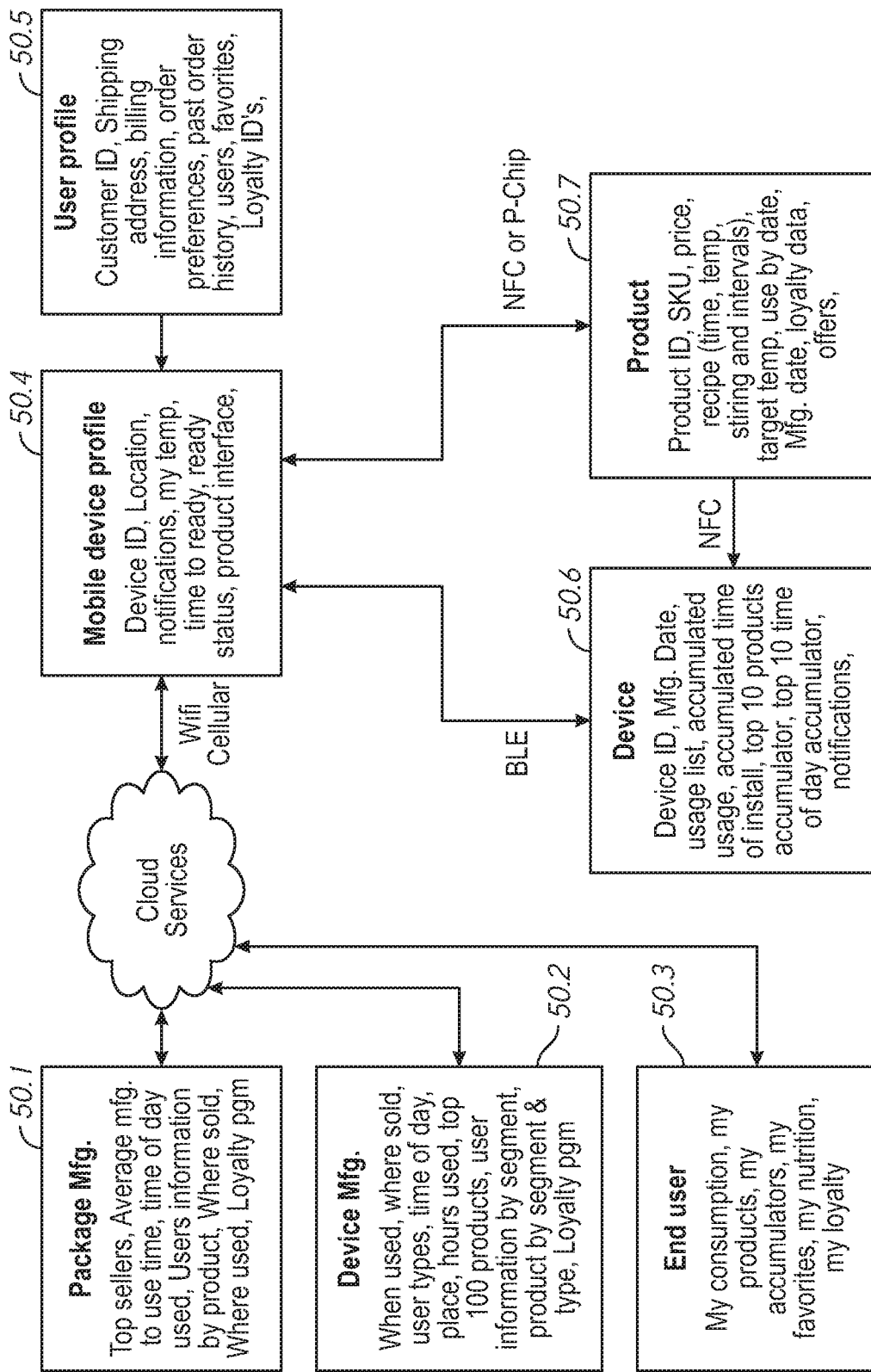
FIG. 2 is a block diagram of data sets and a data architecture that may be used by a smart appliance.

FIG. 2 is a block diagram showing an example data architecture that may be utilized by example appliances in accordance with aspects of the disclosure. A package manufacturing data set 50.1 may include data identifying top sellers, average manufacturing to use time, time of day used, user's information by product, where sold, where used, and loyalty program information. A device manufacturing data set 50.2 may include data regarding where the appliance will be used, where it was sold, user types, time of day, place, hours used, top 100 products used, user information by segment, product by segment and type, and loyalty program information. An end user data set 50.3 may include information relating to a user's consumption, products used, accumulator information, favorites, nutrition information and loyalty information for the user; an end user data set 50.3 may include user consumption data, an identification of products used or researched, accumulated values of amounts consumed, favorite products, user nutritional information and user loyalty data. The package manufacturing data set 50.1, device manufacturing data set 50.2 and end user data set 50.3 may be accessible via a cloud service via the WAN 10 (FIG. 1).

Still referring to FIG. 2, other data sets in an example data architecture may include data from a mobile device profile 50.4 which may include a device ID, device location, various notifications, a sensed local temperature or other environmental conditions, a time indicating when a product is ready (i.e., cooking is complete), a ready status indicator or flag and product interface data which relates to the mobile device interaction with a given product. Mobile device profile data 50.4 may be conveyed and received via WiFi or cellular data connection to the cloud services. A user profile data set 50.5 may reside on the mobile device associated with the mobile device profile 50.4. User profile data set may include a customer identifier, shipping address, billing information, order SKU preferences, past order SKU history, additional users of the device by customer identifier, favorite SKU's list, and loyalty information. A device (appliance) data set 50.6 may include a device ID, manufacturing date, product SKU usage list, accumulated usage by SKU, accumulated time of install, top 10 product SKU's accumulator, top 10 time of day SKU use accumulator, notifications. The device (appliance) data set 50.6 may be linked to the mobile device profile 50.4 via a Bluetooth low energy link (BLE).

Still referring to FIG. 2, a product data set 50.7 may include a product identifier, SKU, price information, recipe information, such as cooking time, cooking temperature, stirring time and intervals, requested end time, altitude, location, a target cooking temperature, target serving temperature, an expiration or use by date, a manufacturing date, loyalty program data and promotional offers data. The product data set 50.7 may include data that represents one or more thermodynamic load profiles (TLP) for a given product package SKU. As will be explained, the TLP may be used to control a heating operation and other operations related to safety or other functions when the package interacts with a smart heating appliance.

FIG. 3 illustrates a table representing a thermodynamic load profile (TLP), in this example, also termed a heating and safety profile, for use in controlling a smart appliance for a particular smart package according to aspects of the disclosure. In this example, a TLP for a microwave popcorn smart package is used. The data in TLP 300 may be generated during a package test and calibration operation that may occur prior to production and shipping of a large number of packages to consumers. Package testing and calibration may occur on a data logging and test appliance, which has the components of the SPHCA of FIG. 1 as well as additional sensors for environmental conditions, for example. Data in TLP may represent environmental parameters such as ambient temperature 302 (i.e., 70 degrees F.), altitude (1222 feet) 304. It will be understood that test or calibration data may be generated for a number of different environmental parameters, such as for different ambient starting temperatures and different altitudes. Data may include a food or product type identifier (popcorn) 306 and a known inductive heating coil frequency (55,660 KHz) 307.

According to aspects of the disclosure, TLP may also include parameters representing thermodynamic response of the package for a number of different steps. In the example shown, data for six steps may be acquired and logged during a packaging testing and calibration operation. For each step, thermodynamic response data correlations are obtained and stored for later use in appliance and package heating control and safety operations. The data correlations may include correlations of heating coil power and duty cycle, heating surface temperature, package internal temperature, time and any other parameters the correlation of which may represent a thermodynamic load or response of the package.

The TLP may include data that represents testing and calibration inputs or "functional measurements", represented by the data in columns (1) thru (8) in FIG. 3—Target Temperature, Time to Target, Charge Surface Temperature, Tag (sensor) Temperature, Voltage, Frequency, Duty Cycle and Measured Power. In addition, data representing direct measurements may be logged as shown in columns (9) thru (11)—Material Probe Low Temp, Material Probe High, Package Probe Temp, which may represent direct temperature measurements made on the package materials and contents.

An example process for testing/calibration and acquisition and logging of the TLP data will now be explained. The TLP data may be developed on a packaging test and calibration system (PTACS). In Step 1, a Test System command function may be executed to bring the package contents to a 90 degree F. Target Temperature within a 5.5 second period. The PTACS allows packaging companies and research personnel to test and design custom experiences. The PTACS may comprise a computer with control steps that records data from the package and typical transmitter or transponder with an output as seen in FIG. 3. The experience designer can use the calibration and test system to set target temperatures and measure what actual temperatures the package achieves and in what time frames. The package fill formula is logged and thermodynamics of the package and materials are recorded with several temperature probes as well as the package LEM or package information system. This system provides for the calibration of the package sensor and various safety offsets for several measured points of the package. The temperature sensor of the transmitter is also measured and when the desired experience is designed the data is output to a data file such as represented in FIG. 3. This TLP data may enables a transmitter to extrapolate measured values while processing the real time data. This system calibrates the package to a variety of thermodynamic properties and builds a thermodynamic profile with the various offsets related to various temperature sensing. This enables the experience to be tracked, and detailed modeling of the package thermodynamic response characteristics, which not only enable efficient control of heating but also enable the package to be authenticated by it's thermodynamic properties as compared to the package data read by the transmitter and to assure altitude and high and low temperature operation and safety considerations. A National Instruments Lab View control system may be used to read the thermocouples and communicate to the transmitter device to gain transmitter data and read package date remotely. This system may be used by designers and package suppliers to properly and safely characterize an experience for a given package. The operation related to FIG. 3 may work in the following manner. Probes may be placed on the target package at the top of package (Material Probe High, column (10)) and at the bottom of the package (Material Probe Low, column (9)), these may typically be the receptor locations and it may be desirable to see this temperature related to the offsets and differences as test personnel seeks to insulate this temperature from the outside package. The receptor temperature (column (9)) is directly measured. The package probe data (column (11)) is data from a calibrator for the tag temperature reading and places in close proximity to that tag sensor. The system may be connected to a test transmitter that operates at a known the frequency 308, power (column(8)), duty cycle (column (7)) and voltage of the rail (DC into the drivers) (column (5)) as well as the surface temperature (column(3)) and ambient temperatures. The system tracks the thermodynamic load for the specific package contents. The system may test thermodynamic responses for minimum fill and maximum fill conditions of a package to get a statistical view of the thermodynamic package and each curve can be loaded into memory on the tag for use by the transmitter if that manufacturer want to see post fill levels. The system commands are then loaded and the test system predefines the energy, frequency and trajectory of the experience. This pre-characterization is important to define the experience and the operational steps to heat properly. The frequency and power may be tuned to the material, material size and proximity of the receptor. The duty cycle may be designed to deliver the best power just off resonance, typically just below or just above resonance for better control. The temperature set point may actually be a combination of the receptor (column (9)) and package probe (column(11)) and top material probe with the material to be heated also being measured. Stirring, shaking and kneading may be needed at specific points to encourage additional even heating. The experience steps and timing are recorded as the experience becomes repeatable. The tag temperature (column(4)) is recorded with the offsets for the related additional calibration probes (columns (9), (10), (11) and (3) to calculate an average temperature for a this package with given thermodynamic load over specific times. The best trajectory and timing is determined by the user and that experience may be loaded as the experience for that package and stored as an image for that tag. That tag is then replicated for production until that formulation or package changes, assuring a great experience that can be replicated and authenticated by the appliance.

Still referring to FIG. 3, use of the TLP in controlling a heating operation will now be explained. In this example, which may be for making popcorn, the process may begin by checking the package. The system may determine the type of package by monitoring the measured inductive coil power vs. inductive coil frequency over a range of frequencies, both higher and lower than a target value. The system may also utilize typical offsets determined in the package testing and placement operation. Thus, this data may be a form of package identification, validation and determination of placement. Test frequencies may also be used to determine placement adjustment. Frequency selection may be determined by the control system once an actual heating process starts. These initial validation steps can be used by the system to confirm that the actual package type placed in the appliance is the expected type of package. Thus, the TLP may be used in initial operations for package validation. Once package validation (and authentication, as will be explained) occur, the package heating operations may be undertaken by the system using previously determined heating trajectories and ranges of the operation, as will be explained.

Still referring to FIG. 3, the TLP includes information that correlates system parameters, such as surface temperature, with different steps in a heating operation. Because the monitored parameters vary linearly, the data points in the table representing the TLP may represent a continuous control curve and the system may calculate the expected change of a given parameter over time using the data set stored in the TLP.

According to aspects of the disclosure, each of the sensed parameters may have include an error threshold such that when sensed values, such as temperature, deviate from the prescribed curve (data correlation) by an amount that exceeds the error threshold, the system indicates a fault and the heating operation may be interrupted or terminated. This provides a very safe operating system with no single point of failure. In prior art systems, this has been an issue, especially in relation to enabling unattended or remote heating/cooking.

Still referring to FIG. 3, various commands, each representing a heating process or heating process related operation may be represented in the TLP. For example, step 2 represents a heat to target operation. Step 3 represents a hold heat and finish heat operation. Step 4 may be a pause cook operation. Step 5 may be a hold heat operation. Step 6 may be an "off" status operation. During each of these operations, the appliance may control the package heating while tracking power, surface, package and time. Offsets may be adjusted for ambient temp and altitude offsetting the linear performance of time and temperature curves. Duty cycle or frequency may be used to offset power and tune to a better package power. Tests can be made with known frequency interactions. For example, if the ideal for the package is 55.56 KHz, there will be a different reaction at 50 KHz and 60 KHz and these frequencies provide guide points for validation. A safe guideline for the starting error may about 7% of target for each area of monitored interest. Once the package or end manufacturer determines the optimal heating experience steps for a given package type, using a test or calibration platform, and the data is stored in a TLP corresponding to that particular package, a heating appliance according to aspects of the disclosure may retrieve the TLP that corresponds to that package and may perform the same operations and according to the same control parameters to replicate the heating experience according to the initially determined test/calibration steps.

The TLP's according to aspects of the disclosure may include power expectation information, which may include data that correlates time with package temperature, receptor frequency, receptor temperature, surface temperature, current, voltage and power as set forth in example Table A below:

TABLE A

| Time | Package Temp | Receptor Frequency | Receptor Temp | Surface Temp | Tx Current | Tx Voltage | Power |
|---|---|---|---|---|---|---|---|
| 0 | 70.00 | 555000 | 70 | 70 | 2.9 | 27 | 78.3 |
| 0.1 | 72.19 | 555000 | 76.44 | 72.8 | 2.9 | 27 | 78.3 |
| 0.2 | 74.38 | 555000 | 82.88 | 75.60 | 2.9 | 27 | 78.3 |
| 0.3 | 76.56 | 555000 | 89.31 | 78.4 | 2.9 | 27 | 78.3 |
| 0.4 | 78.75 | 555000 | 95.75 | 81.2 | 2.9 | 27 | 78.3 |
| 0.5 | 80.94 | 555000 | 102.19 | 84 | 2.9 | 27 | 78.3 |
| 0.6 | 83.13 | 555000 | 108.63 | 86.8 | 2.9 | 27 | 78.3 |
| 0.7 | 85.31 | 555000 | 115.06 | 89.6 | 2.9 | 27 | 78.3 |
| 0.8 | 87.50 | 555000 | 121.50 | 92.4 | 2.9 | 27 | 78.3 |
| 0.9 | 89.69 | 555000 | 127.94 | 95.2 | 2.9 | 27 | 78.3 |
| 1.0 | 91.88 | 555000 | 134.38 | 98 | 2.9 | 27 | 78.3 |

According to aspects of the disclosure, other data that may be stored in the TLP may include use by (expiration) date; minimal and maximal power profiles with ambient offsets, ambient temperature measurement for profile time and temperature offsets; temperature profiles; minimum liquid, maximum liquid, ideal profile, time and temp, altitude offsets by location and heating methods. The energy required to heat the package may have some major modifiers for profiles. The first is a starting or ambient temperature. This is a time and energy offset to the profiles as the starting point. It may determine a new cooking time and either adds to subtracts to the energy and cook time required. Another parameter may include pressure for altitude also has an offset requiring different temperatures for altitude. These altitude offsets may be saved as a table and when the user inputs the altitude the system may utilize the offsets. If not, the profile will not match and the system will shut off when attempting to meet a package profile. These parameters are both safety related and operational modifiers.

Figure 4:
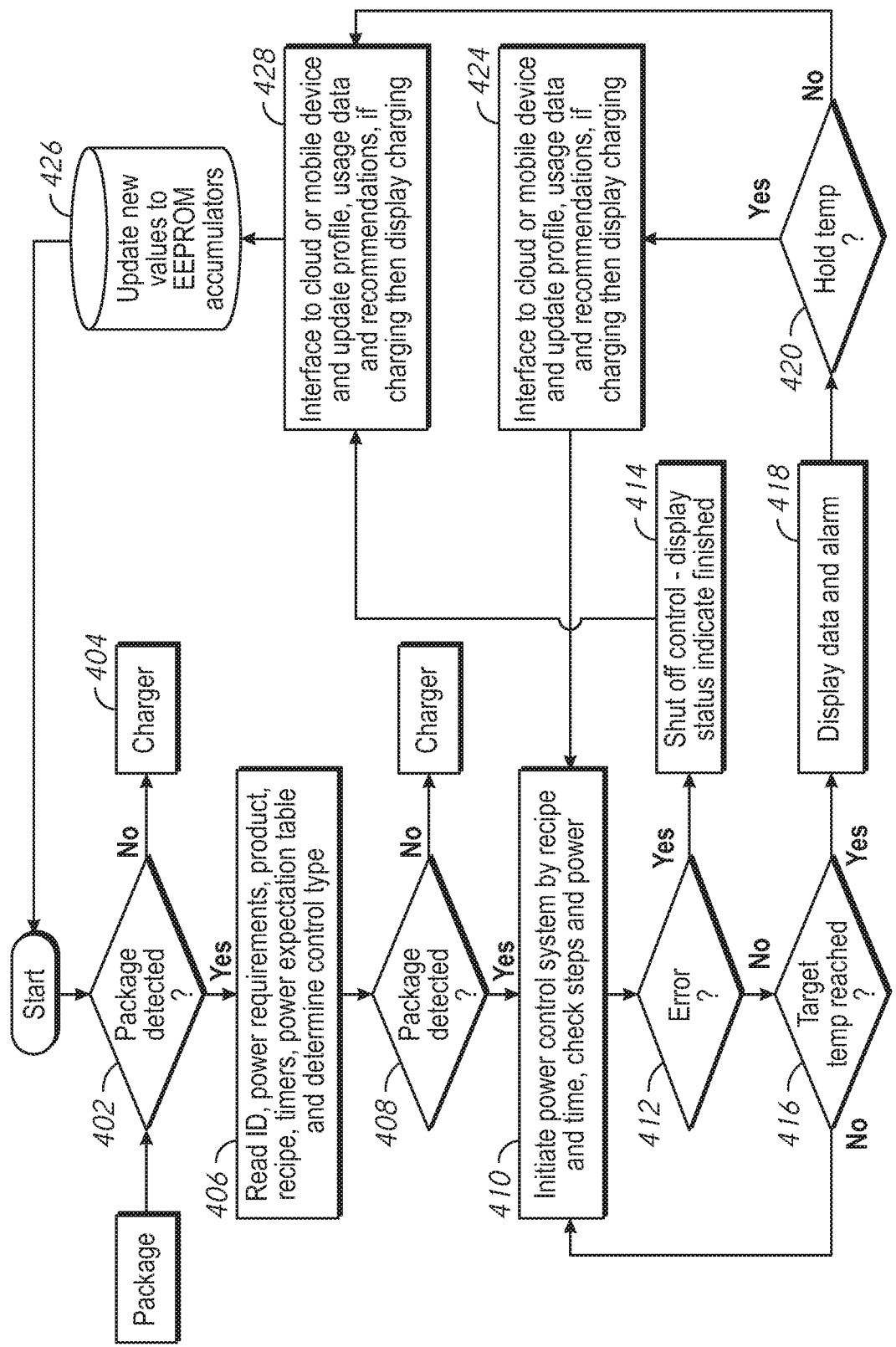
FIG. 4 is a logic flow diagram for a smart appliance for controlling the heating of a smart package.

FIG. 4 is an example logic flow diagram showing logic that may be performed by the SPHCA microcontroller 282 (FIG. 1) to detect a smart package to be heated and to initiate a heating operation for the smart package. At 402, a decision is made as to whether or not a package is detected. This may be done using the transponder or a device analog and digital authentication ping, for example, using the wireless power Qi standard. If no package is detected at 402, the logic proceeds to a charger routine at 504, which will be described herein. If a package is detected at 402, the logic, at step 406, causes the SPHCA reader to obtain a unique identifier as read from the microtransponder, and retrieves from appropriate databases via the WAN 10 (FIG. 1) operating parameters, such as power requirements, product information, profile information, time information, power expectation information, and determines control type. The power expectation may be the power expected with a given offset as discussed earlier. The control system may match a heating curve over time based on the efficiency of power transfer. An ideal match may be determined based on the package placement and operating curve. The system will undertake steps to find a match. If no match is found, the system may indicate that package cannot be validated and that the package has been tampered with. A test stage (FIG. 3, Step 1) may be used to quickly find the starting match for the proper curve. Identifying the proper curve allows additional adjustments to be applied as needed. If the package identified to be offset by 0.5" or more the system may choose to adjust the frequency and power for additional resonant efficiency as one example.

Still referring to FIG. 4, at decision step 408, the logic determines if a package is present and operating temperature as expected in the profile identified in FIG. 3 and Table A. Current vs frequency is also tracked with range limits and surface temp vs power is also checked with range limits. At step 410, the power control system is initiated by profile and time. In a very short time during a power-up step, the system can determine whether or not a given package is performing according to an appropriate TLP. If not, operations are halted. The control system may use all inputs and profile settings to identify present parameters and operation ranges over time and temp to validate against RFID data and expectations. At step 412, an error check is made. If an error is detected control is shut off at step 414 and an interface to cloud step at 428 is performed. New values to EEPROM accumulators are updated at 426 and the logic returns to step 402. If at step 412 no error is detected, a determination is made at 416 as to whether a target temperature is reached. If not, the logic returns to step 410. If yes, the logic displays data and alarm at step 418 and then determines at 420 if the temperature should be held. If yes, the system interfaces to the cloud at 424 and proceeds to step 410. If not, the system interfaces to the cloud at 428 and proceeds to steps 426 and 402 as previously described.

As will be recognized, specific operating thresholds may be stored in a TLP based on materials used in packaging, product attributes an other parameters. A packaging manufacturer may very conservative in setting limits for materials and profiles. Each material will have specific operating thresholds and pretested limits that may be programmed based on a package test system. The authentication process is required for unattended modes where the user would like to heat in the absence of a user. This is required to authenticate the package and the control system thresholds from the updated control database. An additional authentication also occurs when the package behaves as the RFID profile indicates. If a material has an updated threshold or has been recalled we want to identify each package configuration so we can track performance. When the package data is read and the unique ID is obtained that data is shared to the cloud along with the unique appliance ID. The system provides a token for use to operate the system based on an approved test and validation question. The updated information can be used to recall or update the operating information on the fly. Either the product is disabled or it functions under the new profiles.

Figure 5:
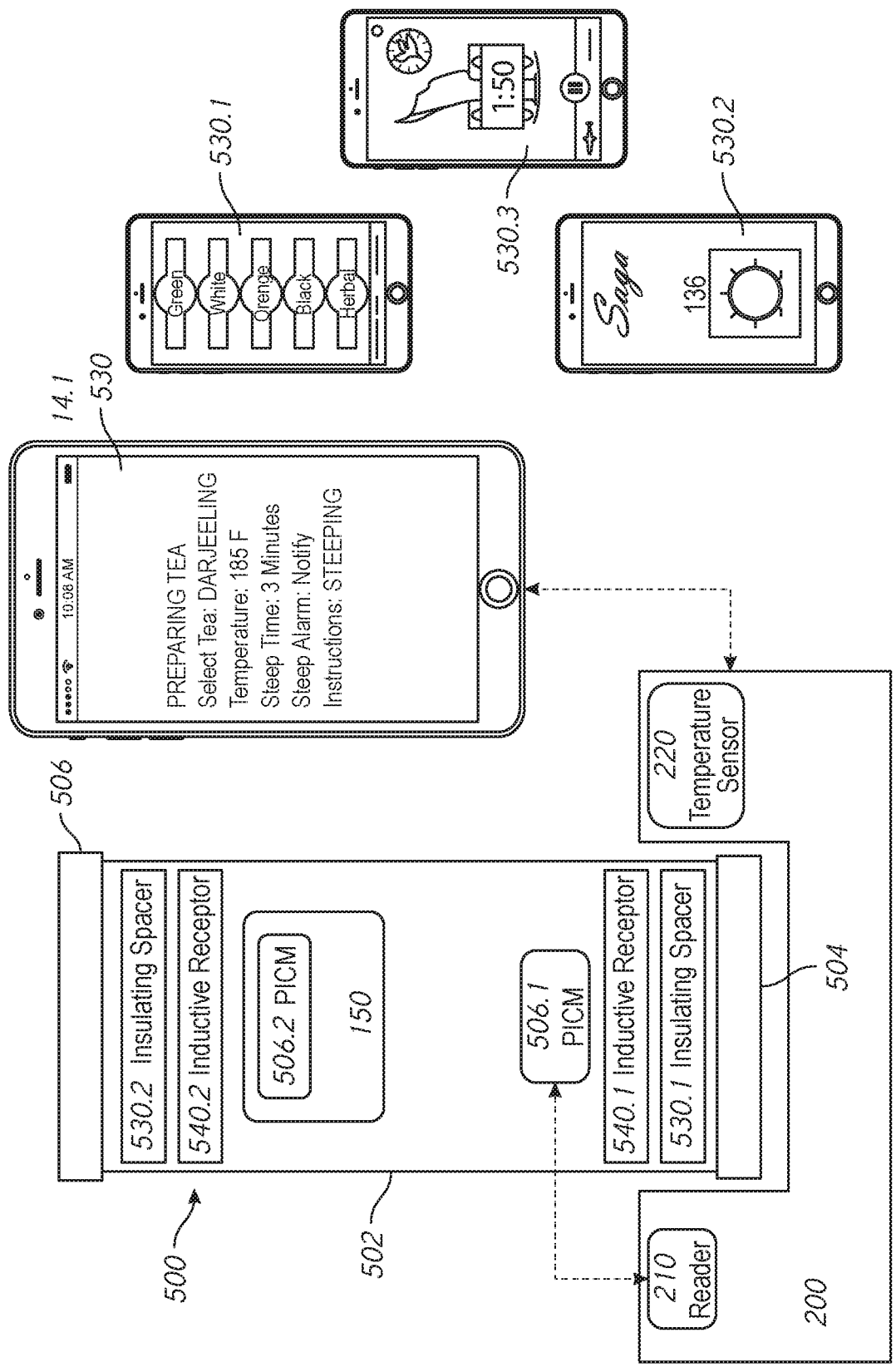
FIG. 5 is a schematic diagram of a smart package and smart appliance for brewing and heating tea.

An example smart package configuration and process for heating a smart package according to aspects of the disclosure will now be explained with reference to FIGS. 5 and 6. An example smart package 500 for brewing tea may include a tea tumbler having cylindrical container body 502 having a container base 504 and a removable (i.e., screw-on) cap 506 at an opposite end. The container 500 may include a first inductive receptor 530.1 and first insulating spacer 540.1 positioned near the base 504. A second inductive receptor 530.2 and second insulating spacer 540.2 are positioned near the cap. A first package intelligence and communication module 506.1 is positioned near the base. A second package intelligence and communication module 506.2 is associated with a tea package 150 secured within the container 500, for example, in a tea basket associated with the cap 506. Container 500 may include a supply of brewing liquid, i.e., water contained therein. The insulating spacer may be a material such as paper or plastic corrugated insulators such as that used for the rings that protect a cup of hot coffee. Smart package 500 may be first positioned on appliance 200 in a heating position shown in FIG. 5 in which the tea container 150 is oriented above the water supply and appliance 200 provides energy to the receptor 530.2 to heat the water to a brewing temperature. When the water attains a desired brewing temperature as sensed by a temperature sensor in PICM 106.2. the tumbler 500 may be inverted and thus oriented in a brewing position for brewing tea. The presence of inductive receptors on each end of the container enable it to be heated in a water heating orientation and flipped to assume a tea steeping/brewing orientation. A mobile device 14.1 running an application for user interaction with the appliance 200 may include a display 530 of relevant information to a user including a tea selection (DARJEELING); brewing temperature (185 F); Steep Time (3 minutes); Steep Alarm Status Setting (Notify) and Instructions(Steeping). User interface may also include displays and user input prompts for tea selection 530.1; steeping temperature 530.2 and steeping time 530.3.

According to aspects of the disclosure, a data set representing a desired steeping temperature for the water may be retrieved based on a user interaction with a mobile device 14.1 that interfaces with appliance 200. The data set may include information representing brewing temperatures and times for different types of tea, for example, as represented in TABLE B below:

TABLE B

| Tea Type | Water Temp (F.) | BrewingTime (min) |
|---|---|---|
| White | 175-185 | 1-3 |
| Green | 180-185 | 3 |
| Black | 206 | 3-5 |
| Darjeeling | 185 | 3 |

Figure 6:
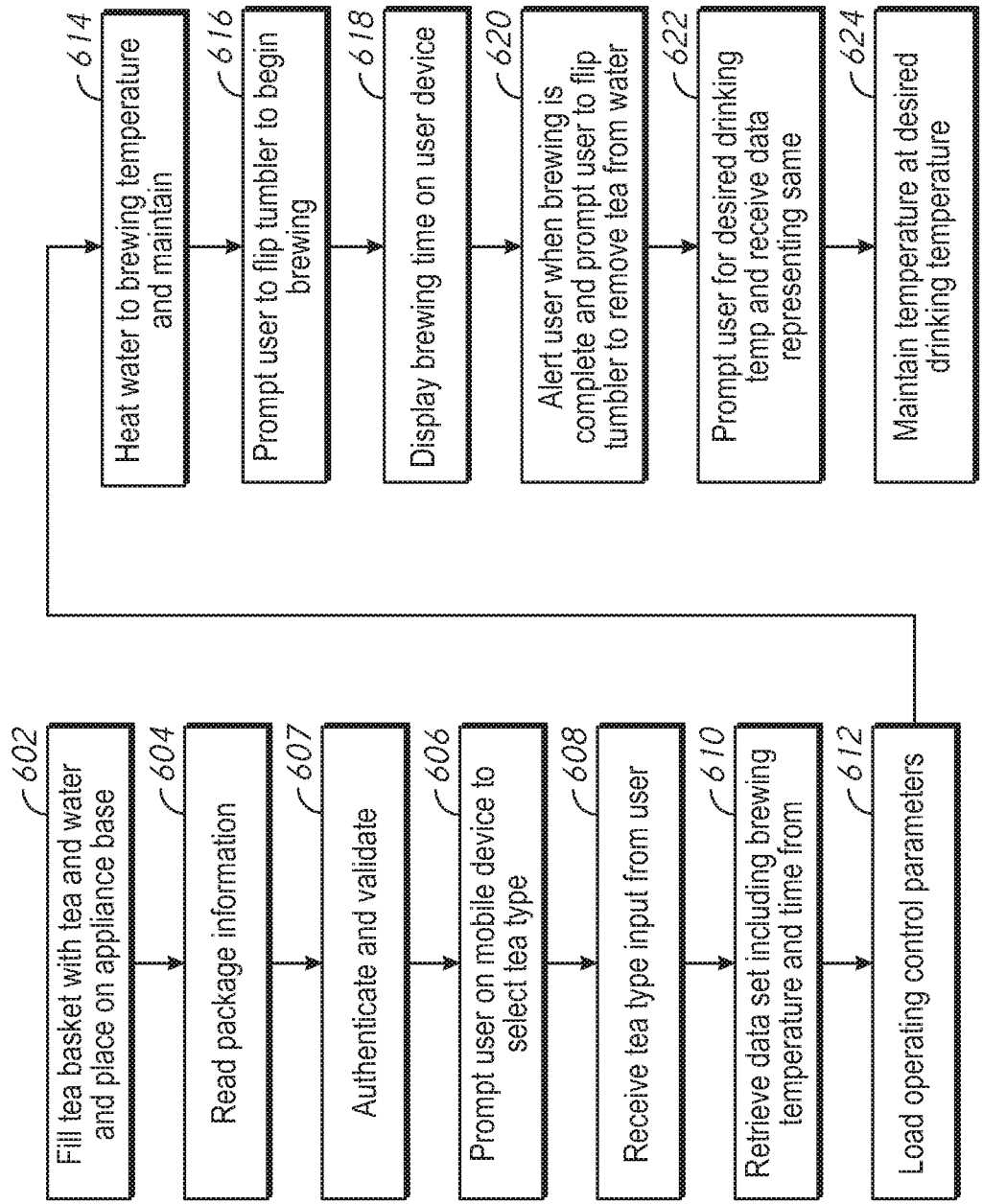
FIG. 6 is a logic flow diagram for operating a smart appliance in a tea brewing and heating operation.

Referring additionally to FIG. 6, a method of operating a smart appliance 200 according to an aspect of the disclosure for brewing tea in the smart package, such as the tea tumbler, described above is further detailed. At step 602, a user may insert a smart tea package into a basket in the container cap, fill the container with a suitable amount of water and place the container on the heating appliance 200 in the heating orientation shown in FIG. 5 in order to apply inductive heating energy to the water. At step 603, an authentication step may occur for the tea package, container and even the appliance, according to systems and methods that will be described. At step 604, the smart appliance reader 210 (FIG. 1) may receive identifying information for the tea package. In addition, identifying information for the brewing container may also be received from the PCIM 506.2 (FIG. 1). The identifying information may include a unique serial number for the tea packet and for the container. This identifying information may be used to retrieve additional information, such as brewing times and temperatures, to automatically control the brewing operation. At 606, a user device, which may be in communication with the heating appliance 200, may display the type of tea being brewed and prompt the user for a selection of the tea type. At 608, information about the type of tea selected is received by the appliance 200. At 610, one or more data sets are retrieved for the brewing operation, based on the tea package information, container information and input by the user. The retrieved data set may include ideal brewing temperature and time for the type of tea selected. At 612, the heating appliance 200 may set operational parameters based on the retrieved data sets, including temperature thresholds, rate of energy applied to the container, thresholds for detection of foreign objects or faulty packaging and others as described above. At 614, the water is heated to the desired brewing temperature by the heating appliance 200 under control of the control subsystem 280 (FIG. 1). The ideal water temperature may be retrieved from a database, based on the unique identifier associated with the tea packet. The temperature of the water may be monitored by a temperature sensor associated with PICM 506.2 and conveyed to the heating appliance 200. Information may be displayed real-time to the user on a user device or on the user interface 250 (FIG. 1) of the appliance 200. At 616, after the desired brewing temperature is attained, the user is prompted via the user interface to flip or invert the tumbler to a brewing orientation. Water in the container then surrounds the PCIM 506.1 and may continue to be heated or maintained at a desired temperature using inductive receptor 130.1. At 618, a desired brewing time is displayed to the user to indicate the time remaining for brewing. At 620, after the desired brewing time has passed, the user is alerted that brewing is complete and prompted to flip the tumbler back to the heating position. At 622, the user may be prompted for a desired drinking temperature and the data entered by the user corresponding to the selection is conveyed to the appliance 200. At 624, the appliance maintains the desired drinking temperature until the user consumes the tea.

Figure 7:
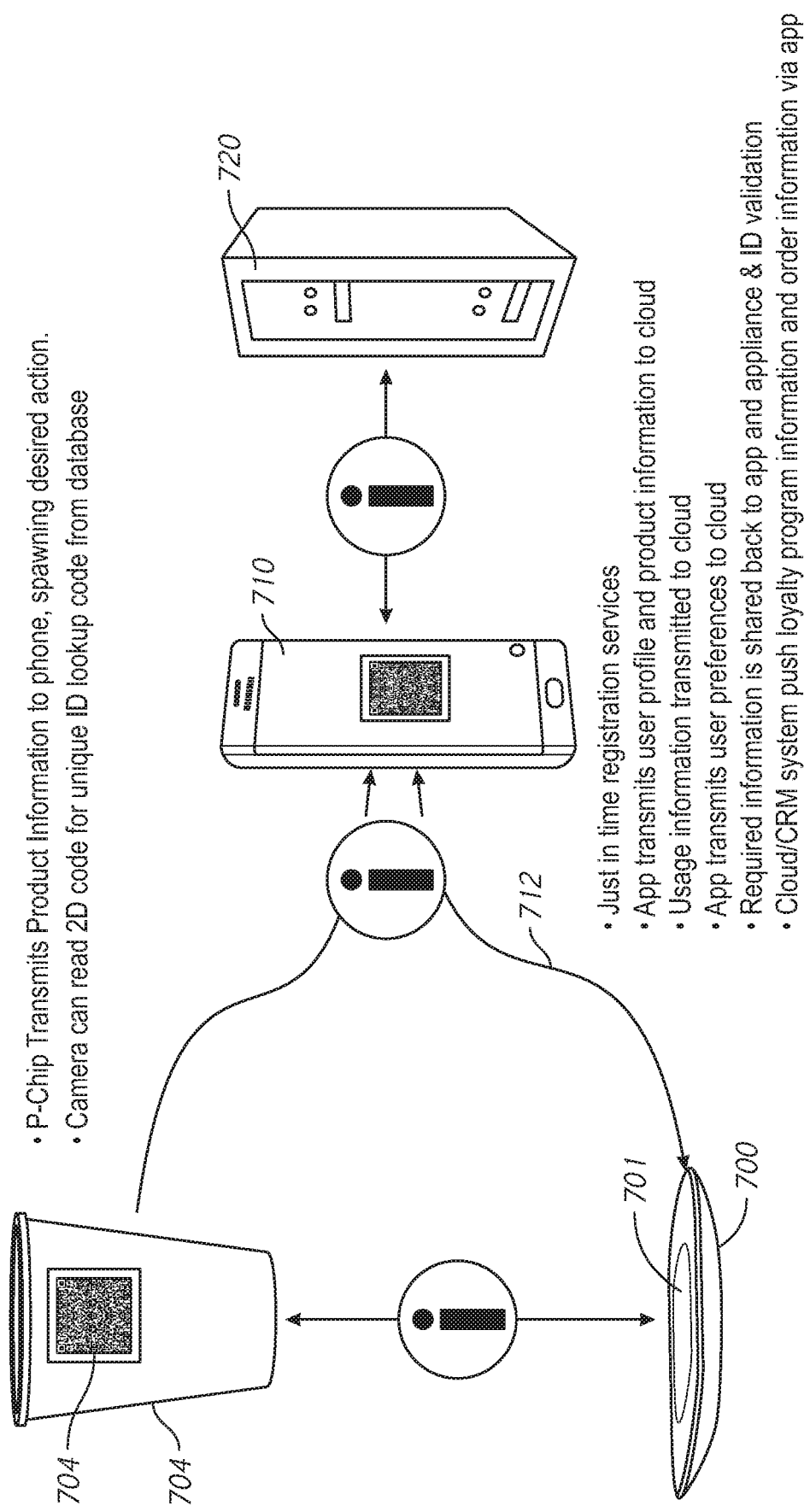
FIG. 7 is a schematic diagram of a smart package and smart appliance utilizing a light powered microtransponder and reader and showing information flow.

FIG. 7 illustrates additional information exchange configurations as well as an alternative appliance 700 according to aspects of the disclosure which may utilize a P-chip transponder and a P-chip reader. Appliance 700 may include a circular recess 701 which receives a cup 702. A P-chip transponder (not shown) may be located centrally within the base of the cup 702. A light source, such as a laser may be located in the appliance 700 and positioned to deliver light to the centrally located P-chip to power it. Data may be read from the transponder to identify the product, packaging and other relevant information. The P-chip may thus convey information to the appliance 700, which in turn may convey information to a mobile device 710 via wireless link 712. The package may alternatively or in addition be provided with a 2-dimensional code 704 which may be read by a camera on the mobile device 710 in order to identify the unique ID of the product which may be stored in a cloud database and retrieved. Mobile device 710 may retrieve information from and send information to a remote server 720. configuration may provide just-in-time registration services for products and users. The mobile device application may transmit a user profile and product information to the cloud. Usage information may also be transmitted to the cloud. User preferences may also be transmitted to the cloud. Required information may be shared back to the application and to the appliance 700. Identification and validation of packages may also be provided using this information exchange configuration, as will be explained. Cloud based customer relationship management (CRM) systems may send loyalty information to users and may convey order or re-order information.

Figure 8:
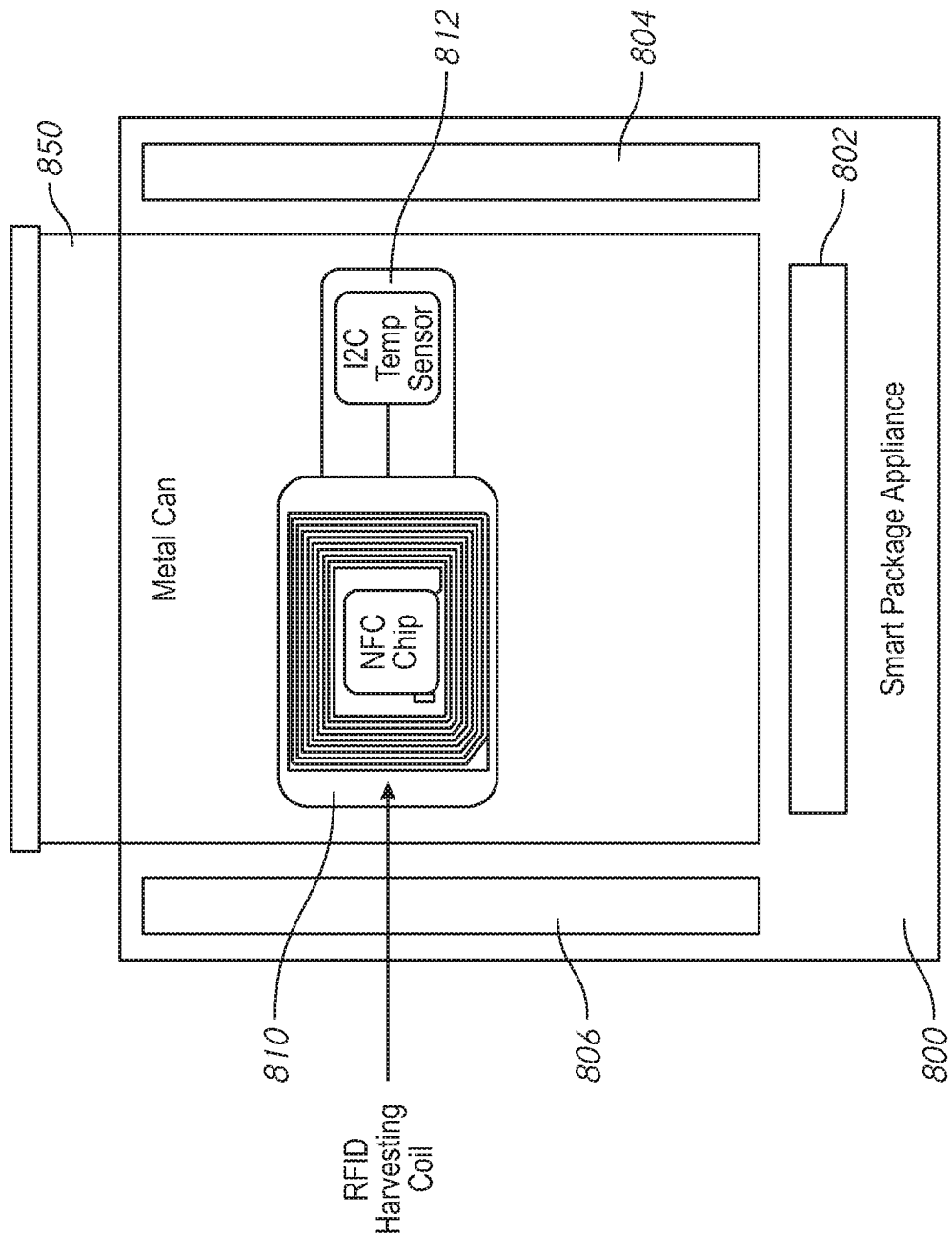
FIG. 8 is a smart appliance with multiple coils for heating smart package having a metal surface.

FIG. 8 illustrates an alternative configuration for an appliance 800 suitable for rapid heating of a package 850, for example, in a vending machine environment for vending heated food or beverage products. The appliance 800 may include a bottom induction coil 802 as well as one or more lateral or side heating coils 804 and 806. Package 850 may be a metal package or may include foil or metallic components with other materials. An NFC chip and an RFID harvesting coil may be located in an insulated tag area 810 defined on package 800. An I2C temperature sensor may be located in a non-insulated tag area 812.

Figure 9:
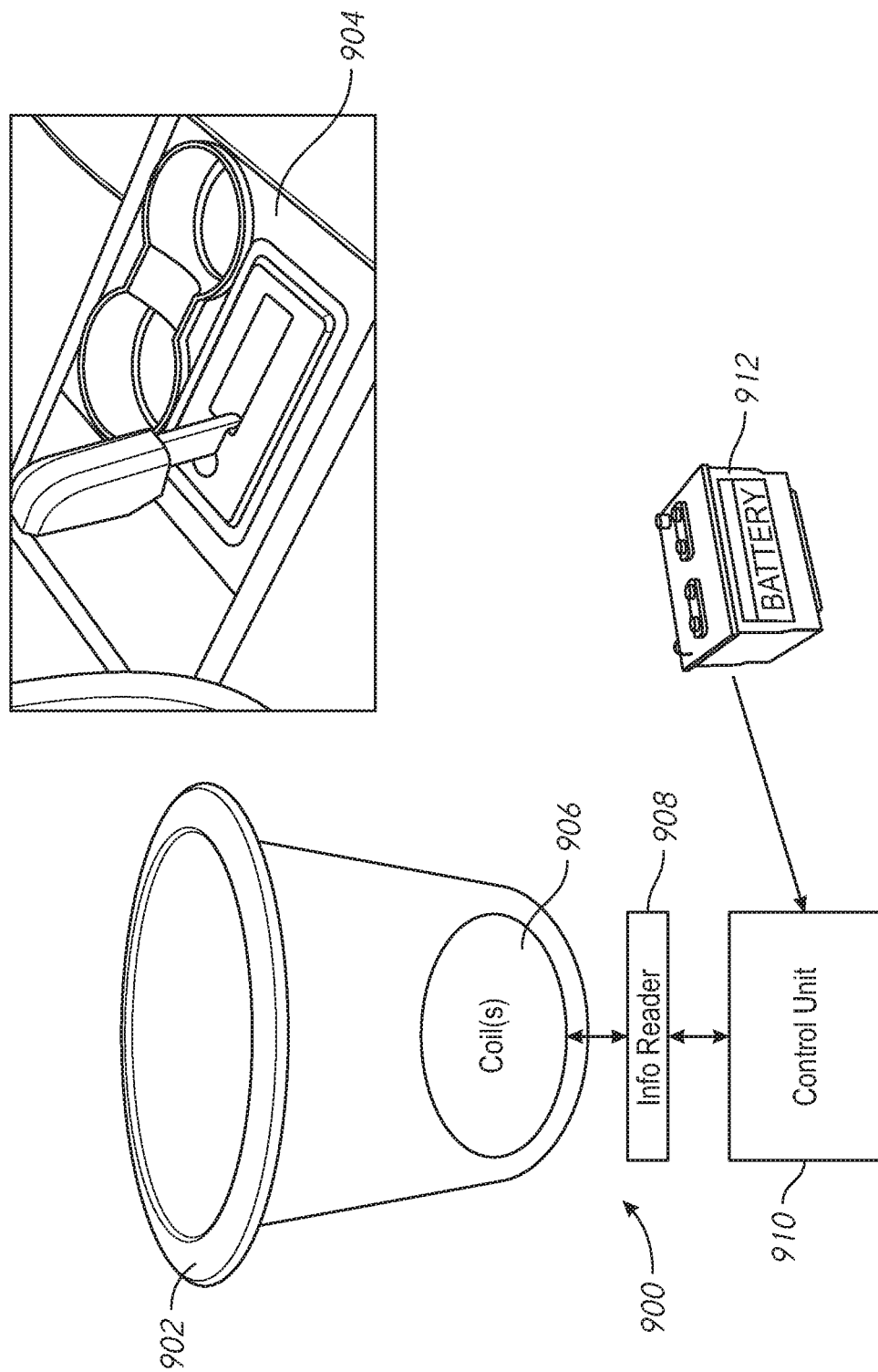
FIG. 9 illustrates a smart appliance configured for operation in an automotive application.

FIG. 9 illustrates another alternative configuration for an appliance 900 suitable for use in a motor vehicle environment. A cup holder insert 902 may be assembled or integrally formed with a vehicle console 904 and may include an inductive heating coil 906 disposed in a bottom surface thereof. Heating coil 906 may be adapted to be powered with a 12-volt vehicle power system. A reader 908 may be disposed within the console for reading RFID/NFC tags on products, such as smart coffee packages or food packages that are disposed within the cup holder 902. A control unit 910, powered by the vehicle battery or power system 912, controls the reader 908. The appliance may be further integrated with an onboard vehicle infotainment or control system or may interface with a mobile device.

Figure 10:
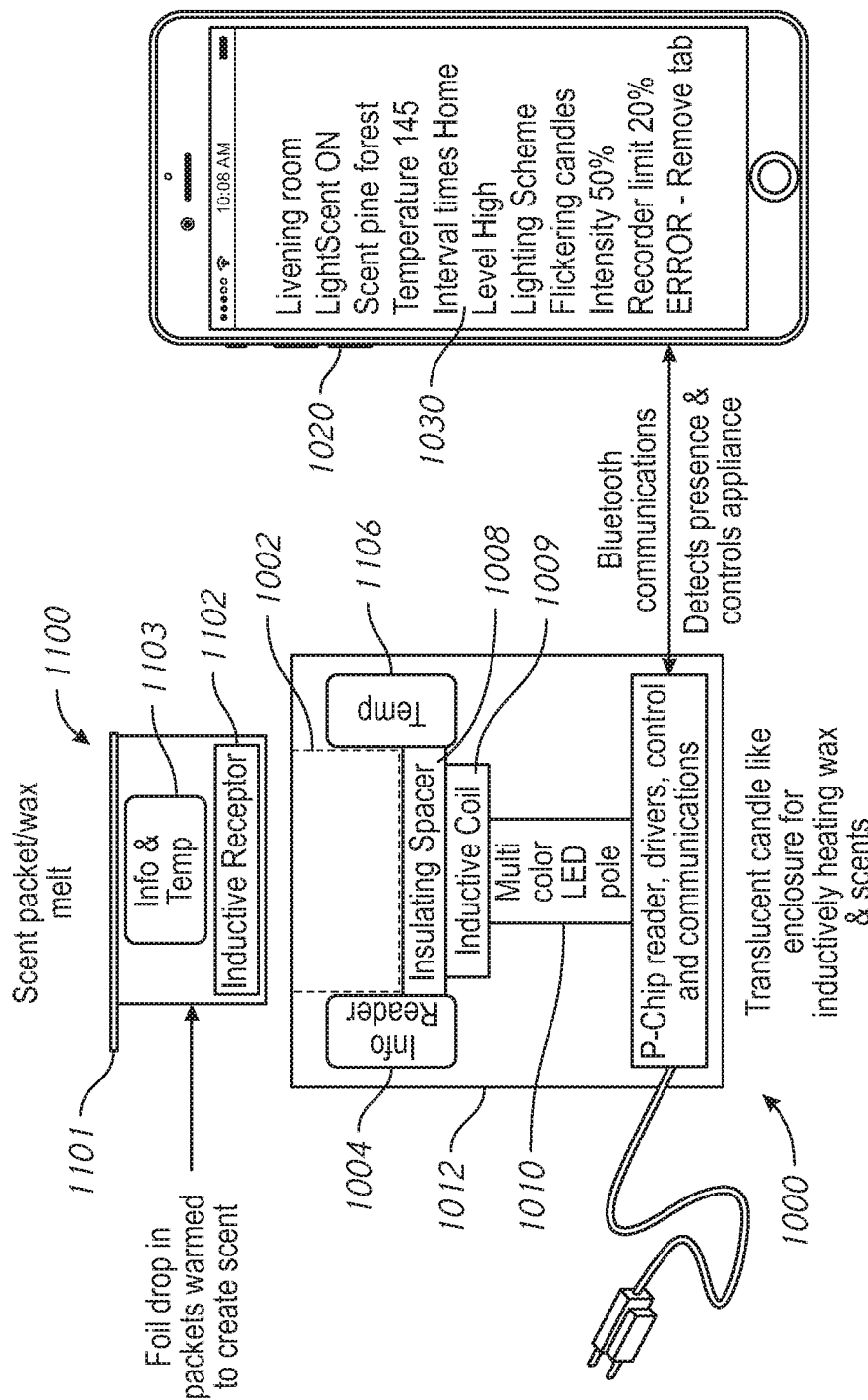
FIG. 10 illustrates a smart package, smart appliance for heating aromatic scent packets and wax melt products.

FIG. 10 illustrates another appliance configuration that may simulate a candle for heating scented waxes and aromatic products. In this case, the smart package 1100 may be in the form of a circular or disk-shaped foil scent packet or wax melt package. The contents may be sealed with a peel off top 1101. A PICM may include an information tag, such as a P-chip, and temperature sensor 1103 within the package 1100, as well as an inductive receptor 1102. Appliance 1000 may include a package receiving recess or pocket 1002 shaped to receive the form of package 1100. A tag reader 1004, which may be a P-chip reader, and temperature sensor 1006 may be disposed near the pocket 1002 to read the package tag and sense the temperature of the appliance. An insulating spacer 1008 and inductive coil 1009 may be controlled with components similar to those in FIG. 1. Multicolor LED lighting 1010 may be included for visual effect and a translucent outer package casing 1012 enables viewing of the internal lighting effects. Light pipes may convey the light from LED lighting 1010 to the outer package casing 1012. A mobile device 1020 may be configured to use for control and reordering of product. An application may interface with the control components on the appliance 1000 and may provide a visual display 1030 indicating a particular room (Living Room), an appliance status (LightScent ON); a type of scent (Pine Forest); a heating temperature (145 F); an interval parameter; a scent level indicator; a lighting scheme indicator (flickering candles); an intensity level (50%); a limit for automatic reordering (20%); and an error field for indicating errors (i.e., Remove Lid/Tab).

Figure 11:
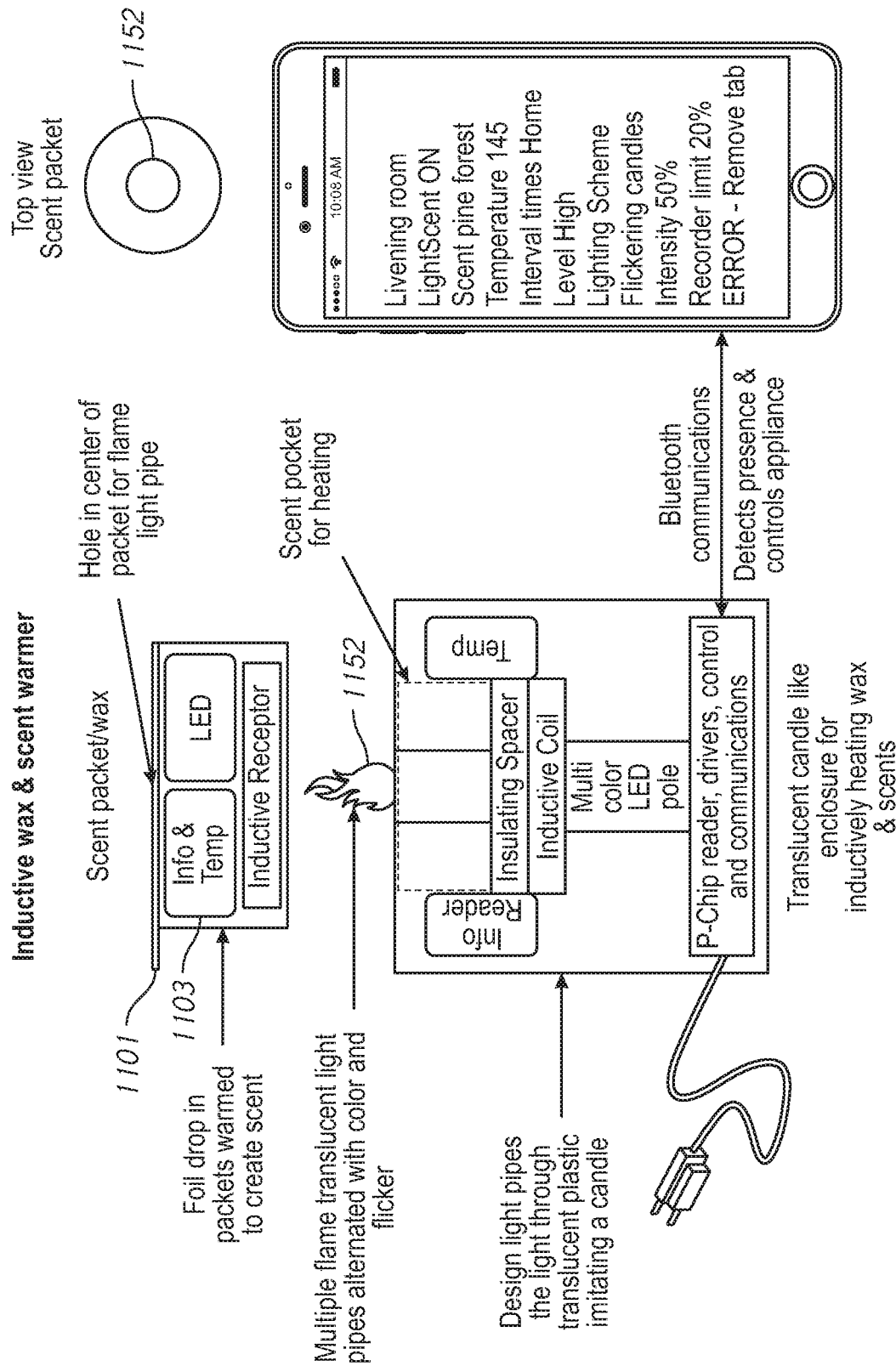
FIG. 11 illustrates another smart package and smart appliance for heating aromatic scent packets and wax melt products.

FIG. 11 illustrates an alternative heating appliance 1150 which further simulates a candle for heating wax or aromatic packages. In this case, the packages may have an annular shape with a central hole 1152. A package LED 1107 may be provided for enhanced or additional visual effects and may be powered with an energy harvesting circuit associated with the PCIM 1103. When inserted into the appliance, the package surrounds a central projecting visual effect on the appliance in the form of one or more flame-shaped prisms or light pipes 1152 which extends thru the central hole when the package is inserted to convey light from the multiple colored LED lighting 1010 to a location above the package to more closely simulate the visual appearance of a candle. Different colored LED lights on the appliance may be cooperatively associated with respective ones of the light pipes or prisms to provide a realistic flame effect. The LED's may be controlled to flicker or display light with various intermittent effects to simulate a candle flame.

Figure 12:
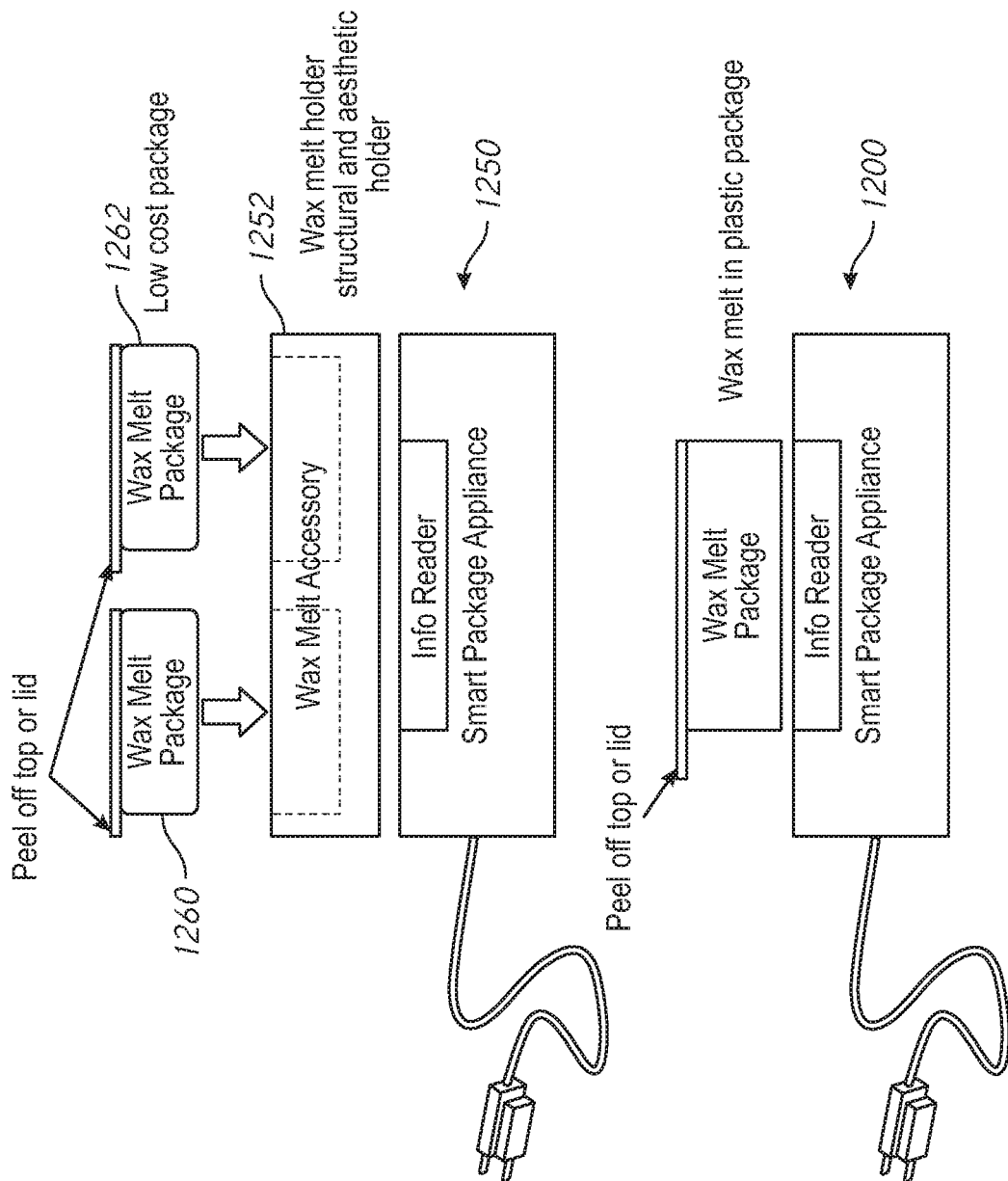
FIG. 12 illustrates another smart package and smart appliance for heating wax melt packages.

FIG. 12 illustrates additional appliance configurations 1200 and 1250 according to an aspect of the disclosure. In these configurations, the wax melt packages may be made without a discrete inductive receptor and instead metallic components on the package may function to inductively heat the contents. Appliance 1200 Although not illustrated, NFC tags and temperature sensors may be included in the packages and in communication with the appliance reader for increased control of heating and safety operations. The packages may be made of paper or plastic components and a metalized liner or foil added to the package structure to function as an inductive receptor. Appliance 1200 is configured to receive and heat a single package. Appliance 1250 is configured with an adapter 1252 to receive multiple packages 1260 and 1262 in respective recesses in the adapter. Adapter 1252 may include aesthetic features to simulate the appearance of a candle or other item. As will be recognized, with the package configuration 1250, adapter may include inductive heating receptors for each package to save costs such that the wax melt packages 1260 and 1262 can be made from low cost materials that do not necessarily have to function as inductive heating components. As will also be recognized, each of the multiple packages can include a PICM for separate interaction with an information reader and control elements on the smart package appliance 1250 as described above relative to FIG. 1.

Figure 13:
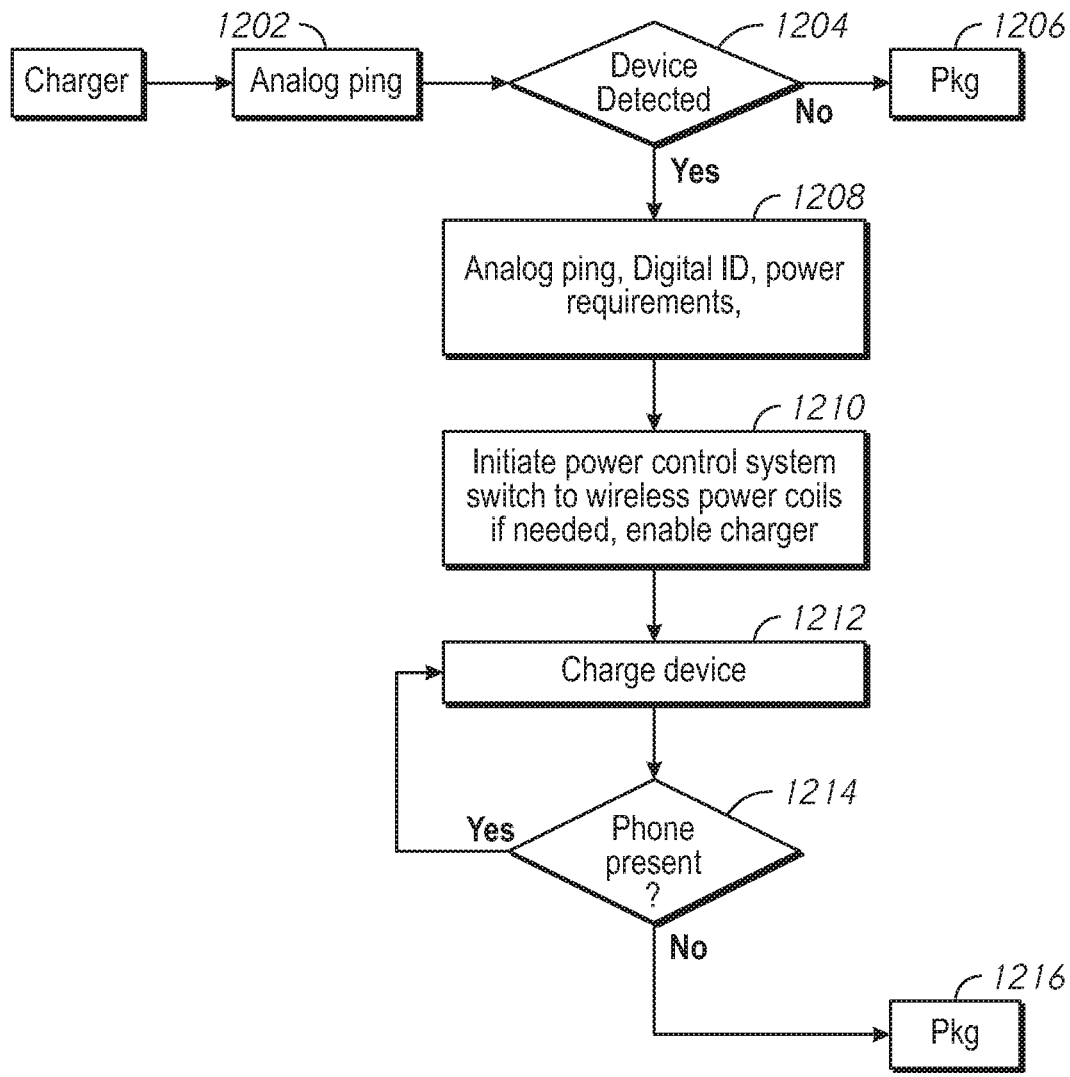
FIG. 13 is a logic flow diagram for an appliance performing a charging operation.

According to an aspect of the disclosure, an example appliance may include systems for both heating operations on packaging as well as charging devices, such as smartphones. An appliance may include charging components as described above in reference to FIG. 1. FIG. 13 is an example logic flow diagram showing a process that may be performed by the SPHCA microcontroller to detect a chargeable device and to initiate a charging operation on that device. This process may be used to charge a phone using a wireless charging standard, such as the Qi standard, which is an open standard. At step 1202, an analog ping may be performed on the object placed in the appliance. The analog ping may be performed using a test frequency and amplitude that will not damage a cell phone or other chargeable object. A receiver may be designed to have a resonant frequency and be detectable with the analog ping. If a positive analog ping is detected, the system may provide more power and look for digital communications validating the receiver and receiver requirements. This is known as a digital ping with is the starting stage of applying power for powering or charging a device. At step 1204, a decision is made as to whether or not a chargeable device is detected. If not, the system determines that a package is present at step 1206 and undergoes steps related to initialization and heating of the package as described above. If a chargeable object is detected, the logic continues to step 1208 where the digital identification information and power requirements of the chargeable object are obtained by the reader or other sensing devices on the appliance. Then at step 1210, the appliance control system switches to the wireless power coil and enables a charging mode of the appliance. At step 1212, the device is charged. At step 1214, a decision is made as to whether or not the chargeable device is still present. If so, the system continues to charge the device at 1212. If not, the logic determines that the chargeable device has been removed and terminates or returns to a package sensing mode at step 1216.

According to an aspect of the disclosure, example appliances may provide authentication, validation and safety operations on packaging based on the interaction between the appliance and the packaging. Validation refers to ensuring the integrity of a package and its contents, and safety related characteristics, for example, ensuring that no tampering or manufacturing defects are present with regard to a product or product package. Authentication of a package refers to an operation of ensuring that a package is an authentic product that has originated from a trusted source rather than a counterfeit product or that a product may be used with a given appliance. Authentication and validation may involve the use of encrypted information to ensure date integrity and mitigate safety risks. Safety operations may include ensuring that package or product temperature thresholds are not exceeded during cooking operations or during consumption or handling.

Figure 14:
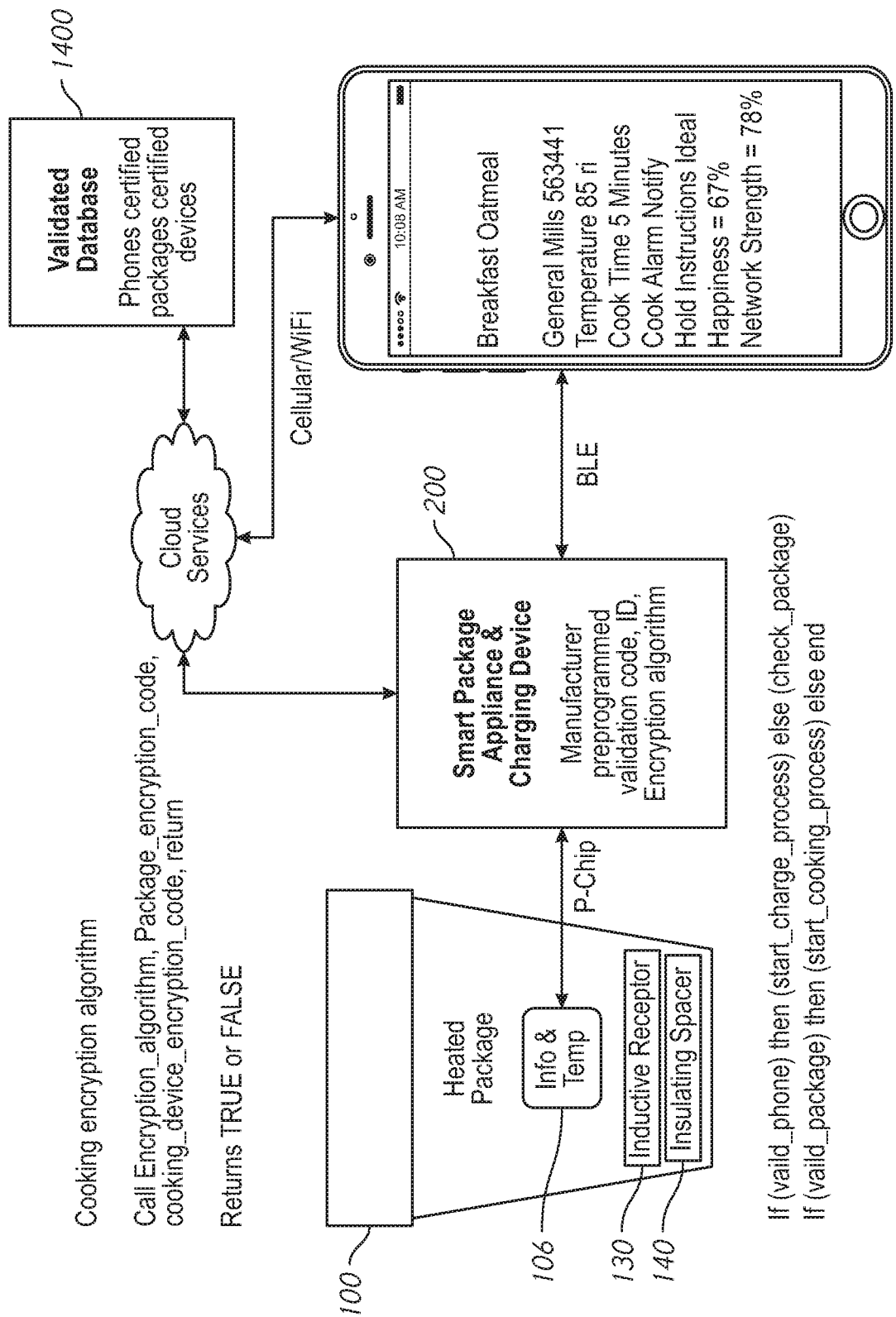
FIG. 14 illustrates a validation and authentication framework for a smart package and smart appliance.

FIG. 14 is a schematic diagram showing the interaction between example system components to achieve validation, authentication and safety. As explained above, with reference to FIG. 1, a package 100 may have a unique identification information stored in PCIM 106, which may include a P-chip, i.e., light powered microtransponder or RFID tag for communicating the unique identifier and other information to the appliance 200. Appliance 200 may include information regarding the appliance manufacturer, a preprogrammed validation code, an appliance unique identifier, and an encryption algorithm for encrypting data. A smartphone or other mobile device may have an application and interface that may also utilize a unique identifier identifying the device and/or user. These unique identifiers may be utilized along with cryptographic algorithm to send encrypted test authentication requests via the cloud to a validation database 1400. The appliance control system may utilize the unique identifiers or a portion thereof to request and receive approval tokens from the validation database 1400. If a positive response is returned from the validation database, the appliance can confirm that a valid package is present. The key element is the certified database that mirrors the unique identifiers. The appliance make implement package validation and authentication via suitable function calls under an operating system governing operation of the microcontroller. For example, a function call to an encryption algorithm may include a package encryption code and a heating appliance (cooking device) encryption code. Logic statements in the algorithm can then incorporate the function call results (i.e., if valid phone then; if valid package then) to condition operations based on package authentication and validity. Validation processes may also provide that only predetermined packages may be used with a given appliance. This validation scheme assures that only approved packaging is used with approved appliances and thereby increases safety.

According to an aspect of the disclosure, package validation processes may utilize TLP data, such as that of FIG. 3 or in Table A above to validate package integrity and safety. As discussed above, the profile used in table A may be generated in advance by a calibrated test system used by a package developer, manufacturer or packaging provider. Materials may be tested and resulting parameters may be stored in the database along with measured field data to determine the allowable variations within the field. Safety thresholds may be saved based on testing and flash point data along with safety margins for each material used. The larger database of test and calibration information is designed to allow the material thresholds to be modified based on field data for safety and operational performance tracking. Having multiple data points like surface temperature, package temperature and power may support tracking of foreign objects and user induced failures in the field. This data can then be used to revise thresholds and allow unsafe conditions to be recognized even more accurately for enhanced safety. This same validation and authentication method may be used for package expiration dates and other information.

Figure 15:
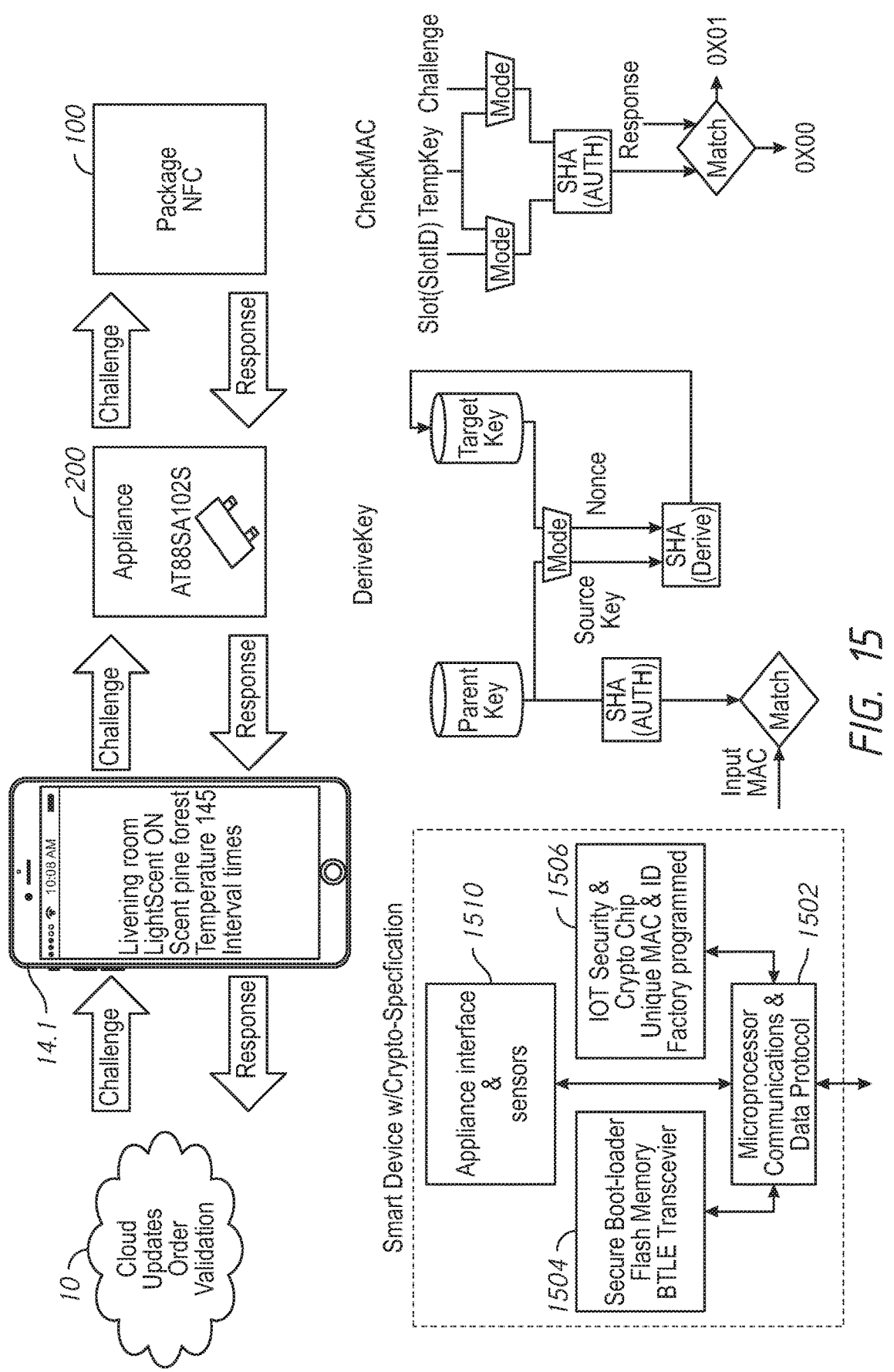
FIG. 15 illustrates further aspects of a smart package validation and authentication framework.

FIG. 15 shows an example security solution and chain of communication applicable to validation and authentication data, including anti-counterfeiting and security, as well as example hardware to support an Internet-of-things (IOT) supported security solution. Security challenges and responses may be implemented between each component in the chain of communication including the package 100, appliance 200, smart device 14.1 and the cloud or WAN 10. The smart device 14.1 may include a crypt-specification implementation wherein a microprocessor 1502, which may be a component of the microcontroller 282 in FIG. 1, in addition to supporting an appliance interface and sensors 1510 may electronically communicate with a secure bootloader flash memory transceiver 1504 and an IOT security and crypto chip 1506 to implement crypto security. Authentication may be based on devices proving their identities to each other. Each device may include a unique device identity (UID) which may be a 48-bit number. the authentication proof is based on the demonstration of the knowledge of a secret code associated with the UID. Cryptographic techniques are used to keep that information secret but verifiable within the code. The AKB based authentication protocol uses techniques called broadcast encryption utilizing a trusted management source of the keys. This provides package suppliers and devices suppliers inclusion or exclusion of products. The encryption may be updated or changed on a based on being hacked or on timely updates by updating appliance firmware. Devices and packages combine the UID and AKB and secret keys to provide two shared secret keys. The devices verify the shared keys using the network challenge/response protocol. The AKB encoding includes Version, Type of AKB, EAK List Start—the byte number in the AKB from where the first encrypted AK is stored, AK Verification Data—the 128-bit value 0x3212445F AF345622BF 44xxxxxx xxxxxxxx encrypted with the Authentication Key encoded in the AKB. Tag Data Stream tags defining the tree stored and the EAK List containing the authentication keys contained in the AKB tree. The unique identifiers coded within the chip or encrypted within the code of the microprocessor are used to generate the test question and an TRUE or FALSE response is used to validate the authentication. DeriveKey shows the crypto authentication process using the unique key and the target key reference for a TRUE/FALSE response.

The smart device 14.1 and other devices, including the appliance 200 and package 100 may utilize Media Access Controller (MAC) addresses for each interface to the network. These may be utilized in validation with function calls, such as the illustrated key derivation call "DeriveKey", which may derive one or more secret keys from a secret value such as a master key, a password, or a passphrase. A CheckMAC function call may be used to validate an encrypted MAC address. Still referring to FIG. 15, an Atmel AT88SA102S chip may be used for crypto generation and unique appliance identifier. The smart appliance uses this device as the unique identifier and generates the challenge request encrypted for response.

Figure 16:
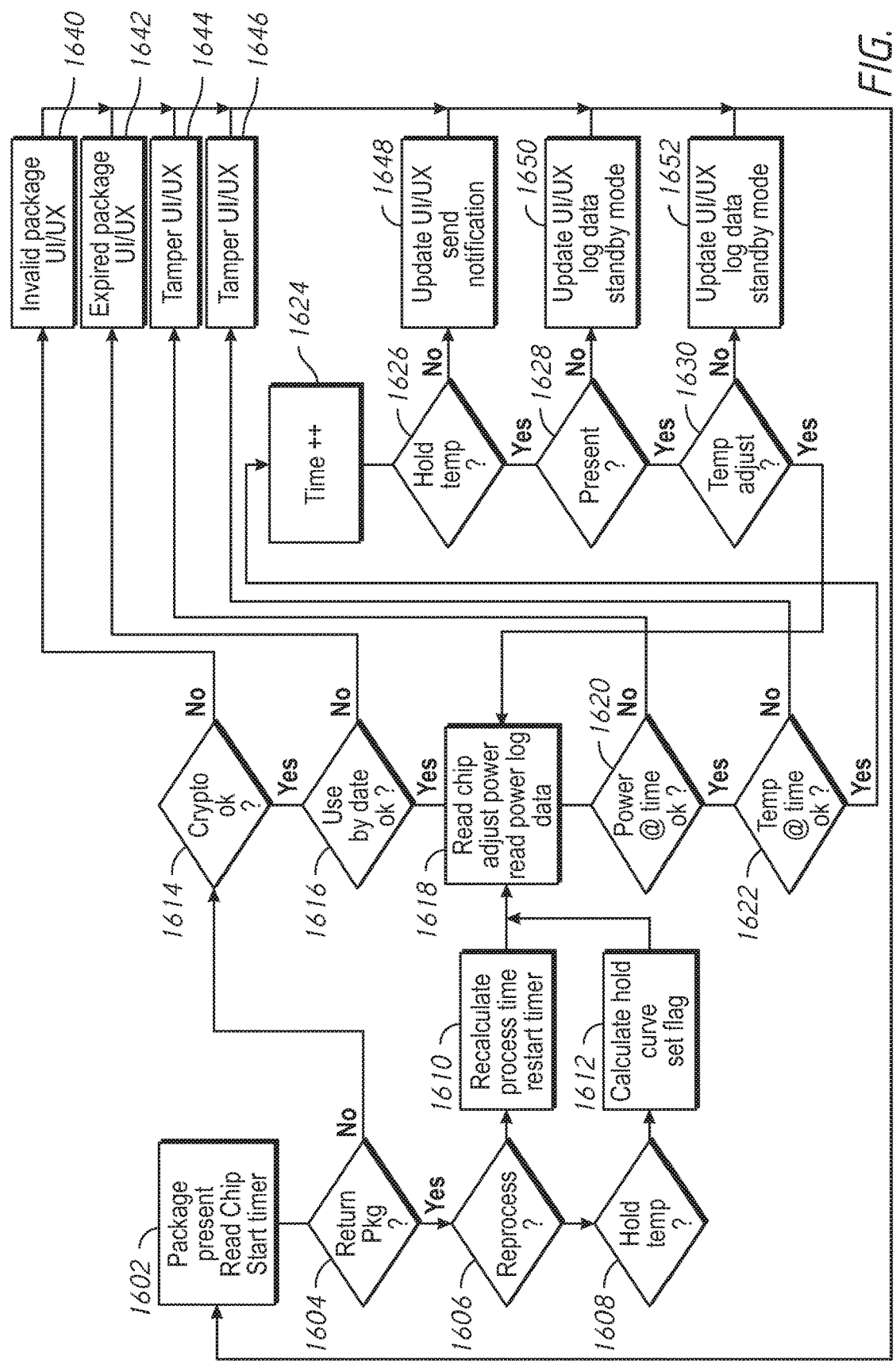
FIG. 16 is a logic flow diagram of a smart package and smart appliance validation operation.

FIG. 16 is an example logic flow for validation and authentication by an example appliance. According to aspects of the disclosure, an example process for identifying the package and validating the package may utilize the package chip, the package and potentially factory settings of an appliance and/or package for authentication. An example process may begin at step 1602 where a package is detected as present, an NFC tag is read and a timer is started. At step 1604, the system checks to see if the package has been heated before, for example, if a stirring operation was performed on a heated package. If the package is detected as having been returned, the process may determine at step 1606 if a reprocessing step is needed. If so, at 1608 a determination is made as to whether a hold temperature has been specified. If so, the process at step 1612 calculates a hold curve and sets a hold temperature flag then proceeds to step 1618. If at step 1606 a determination is made that no reprocessing is needed, at step 1610 the system recalculates a process time and resets a process timer, then proceeds to step 1618 where the PICM is read and the power is adjusted and power data is logged.

If at step 1604 a determination is made that the package is not a returned package, the system proceeds to step 1614 where a cryptographic challenge is undertaken. If the package fails this test, an invalid package indicator is expressed to the user through a user interface at step 1640. If at step 1614 the cryptographic challenge is passed, the process may proceed to an expiration date check at 1616 where expiration data related to the package is compared to a current date. If the package fails this test, an expired package indicator is expressed through the user interface at step 1642. If at step 1616 the package passes the expiration date test, then a heating operation is initiated at step 1618 where the PICM is read and the heating power requirements are determined.

At step 1620, as a heating operation is initiated, the system check the actual monitored power and time against the calibrated data stored in a TLP for the package, as described above. If at step 1620 the package power vs. time correlation is different than what is stored within the TLP, allowing for variances for offsets, for example, the process goes to step 1644 to indicate that the package has been tampered with or otherwise lacks an expected integrity. This indication may be through the user interface. If at step 1620, the package power vs. time correlation is acceptable compared to the TLP data, the process goes to step 1622 where a temperature vs. time data is monitored. If this data does not comply with the temperature vs. time data represented in the TLP, the process goes to step 1646 to indicate package tampering or lacking structural integrity.

If at step 1622 the package temperature vs. time actual data match the TLP, within expected variances, a heating operational sequence is executed. At step 1624 the heating time is updated and at step 1626 a hold temperature determination is made. The UI/UX for operating parameters and is seen as 1626 holding temperature or exit, 1628 in the package not being removed and in 1630 looking for temp adjustments and commands cycling back to the reading of the package temperature 1618. The update UI/UX for completed or stopping is seen in 1648 and the UI/UX update for removing the package is seen in 1650 the logged information is used to set the flag for 1612 when the package is returned. 1652 indicates either an error mode like temperature cannot be reached or the exit mode as in the end of the process and updates the UI/UX.

Figure 17:
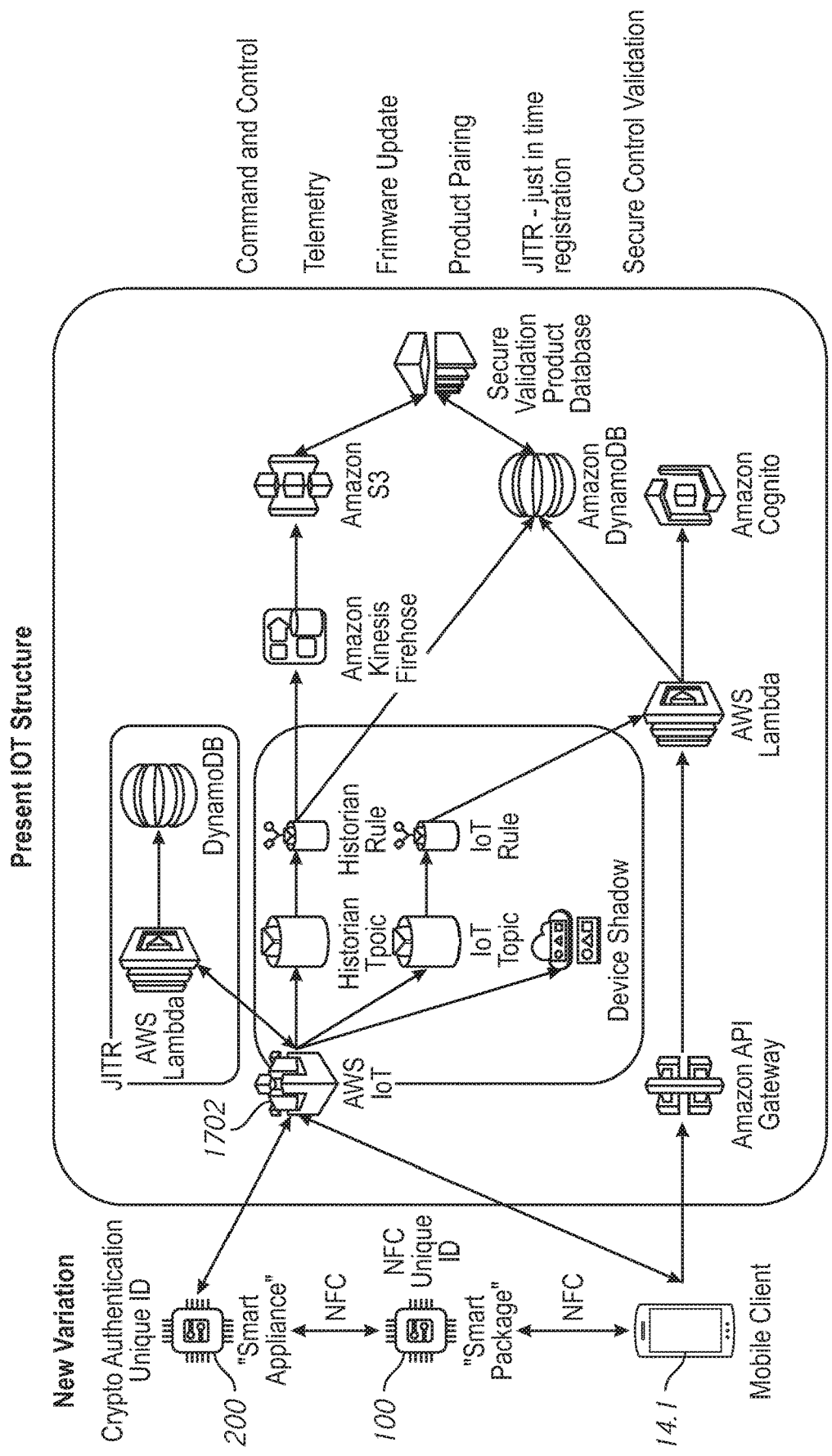
FIG. 17 illustrates an authentication framework and an Internet-of-things (JOT) structure for smart package and smart appliance authentication.

FIG. 17 shows an example web services and database structure to keep a device registry and API gateway for mobile device registration suitable for the cryptographic function calls described above with regard to FIG. 15. The mobile client may obtain information from a web service gateway 1702 and may send information to an API gateway 1704. The smart package may exchange information via NFC with the smart appliance 200, which utilizes its own unique identifier to interface with gateway 1702. [Connection to user and cloud for notification of package temp and time safety aspects of a heated package appliance] According to an aspect of the disclosure, a user may receive information, including notifications of package temperature and time safety information via the wide area network (cloud) connection.

Figure 18:
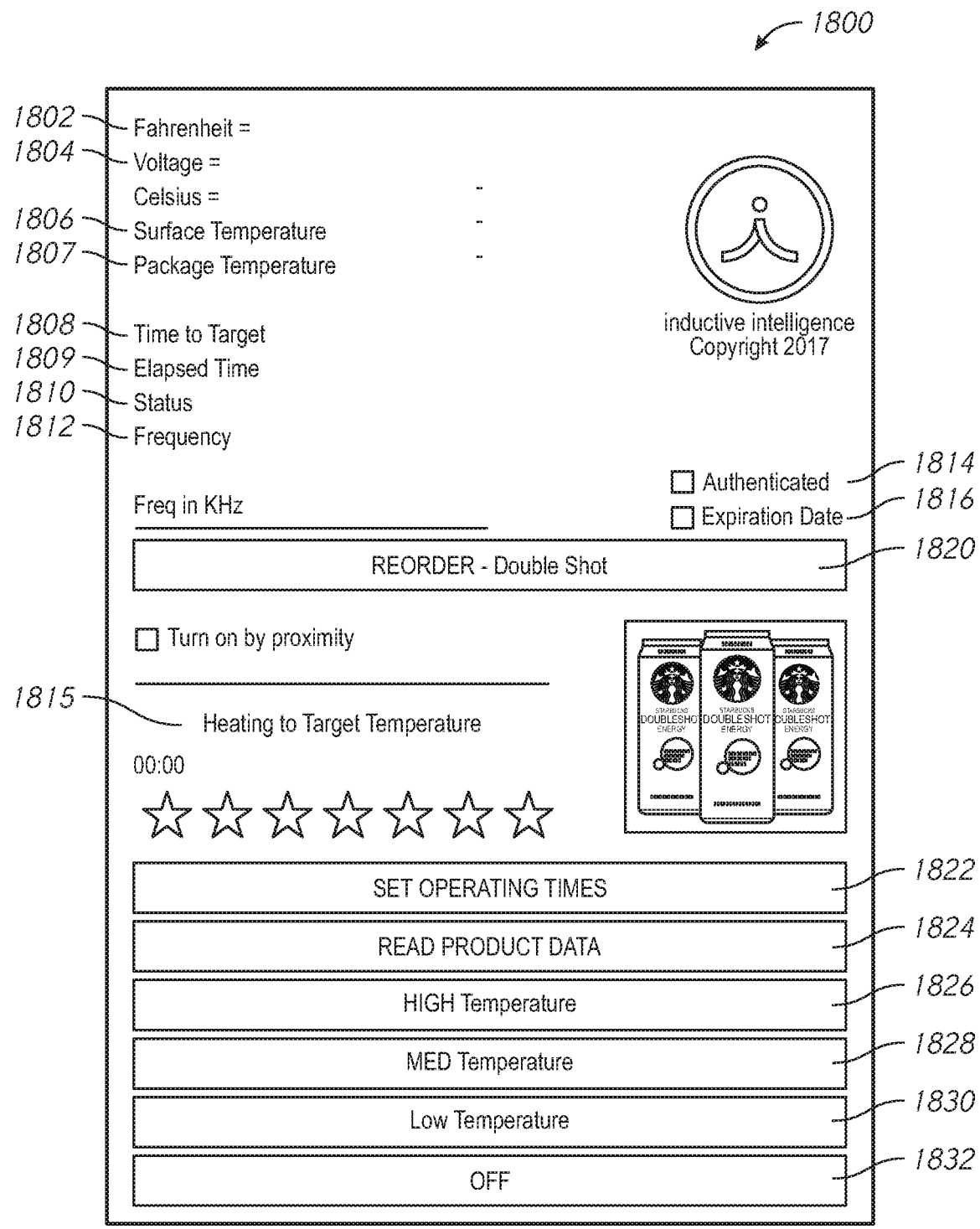
FIG. 18 illustrates a user interface on a smart device for use with a smart appliance and including a product reorder function and others.

FIG. 18 illustrates an example screen of a user interface 1800 on a mobile device. The user interface may include indicators for temperature 1802, voltage 1804, heating surface temperature 1806 and package temperature 1807 as detected by PICM. A time to target indicator 1808 may indicate the time remaining for a product to reach a target temperature. An elapsed time indicator 1809 may indicate elapsed time. A heating operation status indicator 1810 may indicate heating status such as heating, cooling down or off. A frequency indicator 1812 may indicate an inductor frequency. A status field 1815 may indicate an operational status. Flags or check boxes may be set for authenticated products 1814 and expiration date 1816. A reorder button 1820 may be included to provide for easy reordering of depleting product. Additional buttons for permitting a user to undertake operations such as setting operating times, 1822, reading product data 1824, setting high temperature thresholds 1826, medium temperature thresholds 1828 and low temperature thresholds 1830 may be provided, as well as an off button 1832 to shut off power to the appliance or to interrupt a heating operation.

According to an aspect, an example appliance may provide for the detection of foreign objects in product packaging or within the contents (food). During a packaging/manufacturing operation, data may be developed and stored which represents predetermined correlations that result when a foreign object is present in the product or packaging. Such correlations include power vs. temp vs ambient vs foreign object detection (FOD) min & max), max temp package max temp surface and surface to package profiles. Referring to Table A if power is higher than expected the only reasonable outcome is additional objects are located on the surface this is the easy aspect of foreign object detection. The more difficult aspect is determining a package from a device that looks similar. This may be done by the tracking of power, package temp and cooking surface temperature. The surface temperature is recorded under that package on the surface of the smart appliance 220. These correlations may be retrieved by the appliance 200 during a heating operation, or may be stored within the storage 112 in the PICM 106. Monitored parameters during the cooking operation can then be compared to the predetermined correlations to detect tampering or the presence of a foreign object in the packaging. For example, when surface temperature of the inductor surface is tracking higher than an anticipated value, the appliance may determine an abnormal condition, for example, that either the package may have been altered or additional objects are located on the powered surface. A threshold may be established in order to trigger an abnormal condition. For example, if the power tracks either higher or lower than the profile by 7%, this may be used as a firm indication of an altered scenario and may trigger shut off of the appliance. These values can be stored remotely and retrieved over the WAN (FIG. 1). According to aspects of the disclosure, as new data is acquired from operating an installed fleet/base of appliances, aggregate data can be compiled and such thresholds may be altered based on the new data. For example, the 7% threshold can be changed to a more conservative value based on field data or a less conservative number based on successful control. By aggregating data acquired from multiple appliances communicating over the WAN, these parameters can be adjusted and confirmed over time and data verified over large sample sizes.

According to an aspect, aggregated data may also be used to develop optimal heating processes based on package material choices. For example, different packaging papers may have different flashpoints. The system may catalog tested materials and track field performance for safety and compliance. This may be used to assures all materials meet required testing and performance guidelines. It should be noted that the package temperature sensor 120 (FIG. 1) may be placed to assure that an insulator in the packaging is performing properly. Higher temperatures will be seen if the insulator is not working properly as an added safety feature. One point of potential failure is assembly of the package. If the package is assembled without an insulator a package material may have the potential to be exposed to higher than design temperatures. This can be addressed by aligning the package temperature device to track this area. Testing may provide this failure more profile and it can be easily recognized when these limits are seen. Errors and reporting can indicate these types of issues and report them back to the factory According to an aspect, data sets may include data coinciding with different stages of a product's life cycle or supply chain, including data relating to production, distribution, transportation, retail, home, vending, office and automobile stages of product life cycle or supply chain. FIG. 19 illustrates various types of data that may be tracked and stored relating to product life cycle and supply chain. Once data regarding the use of the package tag or chip is acquired, that information and timing can be used to track the full lifecycle of the package and distribution cycle. At the package manufacturer, one may record that data and date, then we fill that package and record that data. Then the package gets stored or shipped and we that data on the chip. Then it may get distributed or stocked on a shelf and can be logged. The package gets purchased and that information and date may be logged. The next data point is use date when placed on the smart appliance and we record that date and share the complete history to the cloud for that unique identifier and SKU. Today companies designing packaging for use by consumers do not typically know the actual use, supply chain timing and end use. Moreover, having the opportunity to engage the customer it becomes a powerful research tool even if only one question is asked in return for loyalty points or a coupon offer upon use. Upon use building the profile of the data above allows artificial intelligence within the database to determine critical use groups by harvesting the profiles of customers and refining new understandings.

Figure 20:
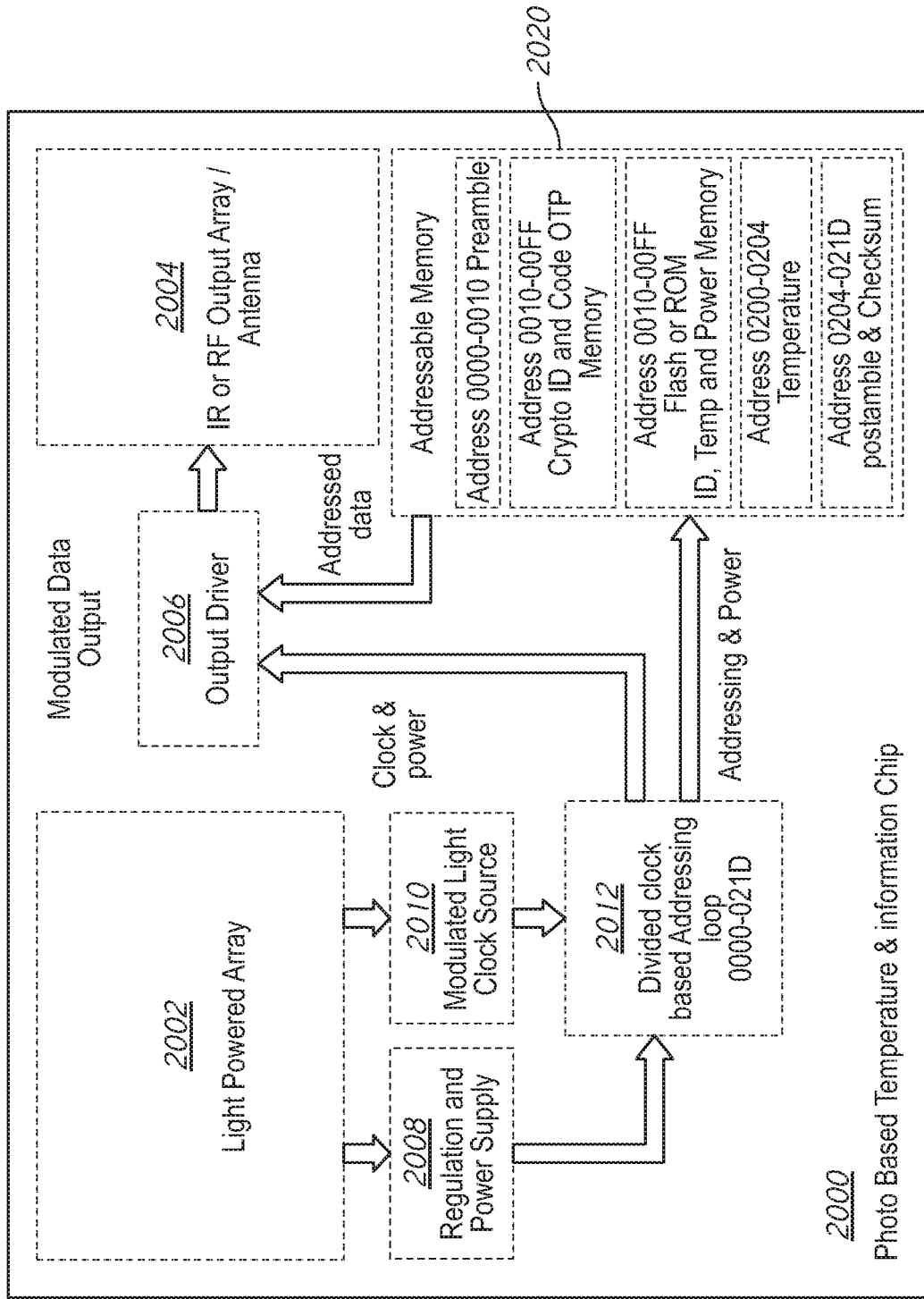
FIG. 20 illustrates a schematic diagram for a light-energized microtransponder temperature and information chip.

FIG. 20 illustrates components of a photo- or light-powered microtransponder 2000 suitable for supporting a PICM according to aspects of the disclosure. A light powered array 2002 creates power from received light. A regulation and power supply 2008 may include storage for electrical energy generated by the light powered array 2002 as well as voltage regulation to power other components. A modulated light clock source 2010 may provide a clocking signal to a divided clock-based addressing loop 2012, which also receives power from the regulation and power supply 2008. Addressing loop 210 provides a signal to an output driver 2006 which drives an infrared or radio frequency output array antenna to communicate information to a reader. A storage 2020 includes layers of addressable memory that may store data including a cryptographic identifier, temperature and power information and other information.

Figure 21:
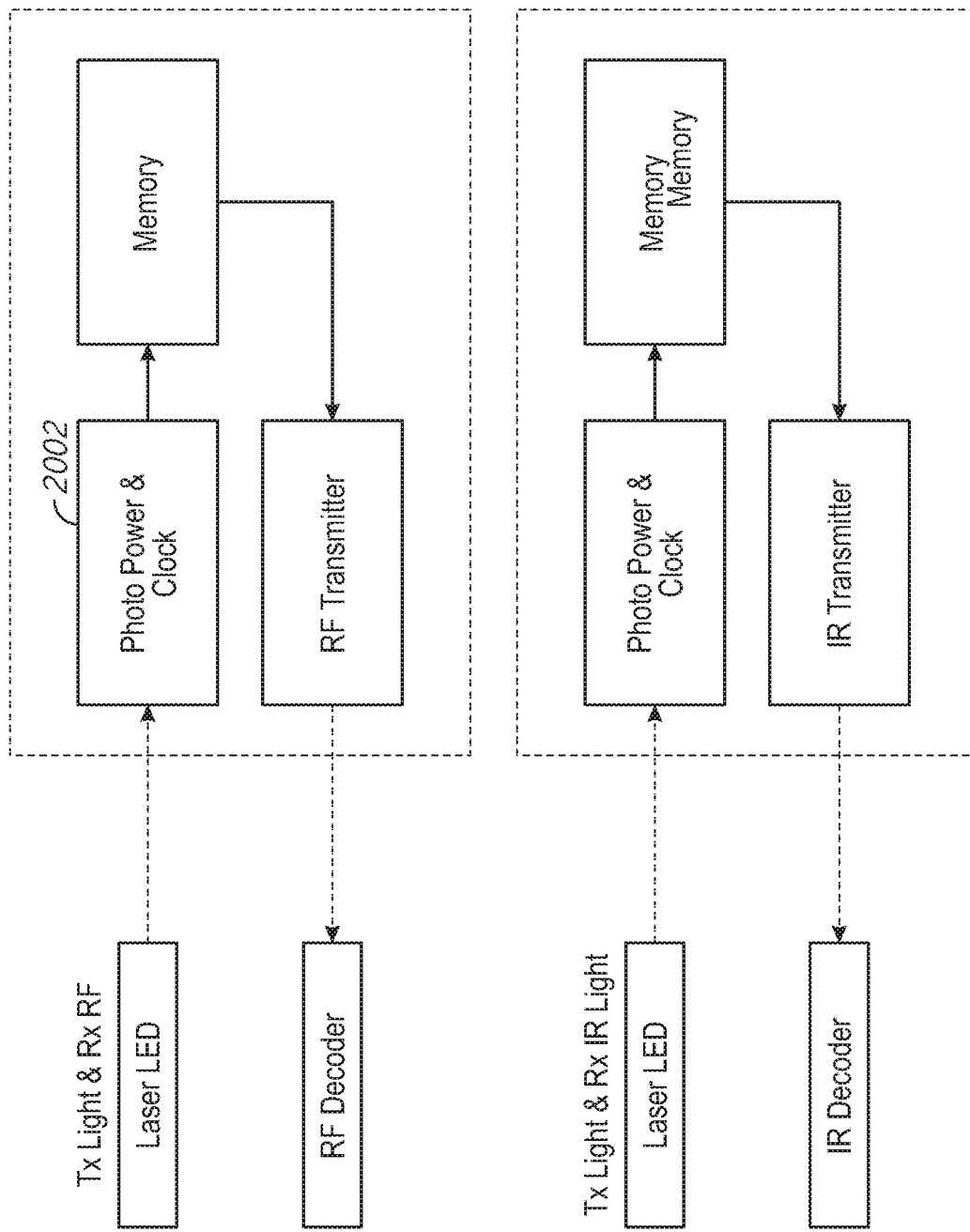
FIG. 21 illustrates a functional block diagram of light-energized microtransponders and readers.

FIG. 21 further schematically illustrates components of a light-powered microtransponder detailed in FIG. 20. Laser LED light may be transmitted from a reader to the photo powered array 2002 which communicates with memory 2020. An RF transmitter may send signals to the reader based on information stored in the memory 2020. Transmission of signals may also be by infrared in line-of-sight applications, as illustrated in the lower figure in FIG. 21.

Although the present invention has been shown and described in detail the same is to be taken by way of example only and not by way of limitation. Numerous changes can be made to the embodiments shown without departing from the scope of the invention. The present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

The invention claimed is:

1. A smart appliance for heating a package, the package including a container for containing contents and a package intelligence and communication module for storing and communicating package design and package content related data, the smart appliance comprising:

an energizing unit for applying energy to the package;
a sensor for measuring an energy response of the energizing unit applying energy to the package;
a package interface for interacting with the package intelligence and communication module of the package, the package interface including:
   a transmitter for transmitting a signal to the package intelligence and communication module of the package; and
   a receiver for receiving the package design and content related data from the package intelligence and communication module of the package;
the energizing unit including a processor for controlling the energy applied to the package and its contents based on the package design and content related data;
wherein the energizing unit is configured to authenticate the package based on the energy response measured by the sensor compared to an energy response associated with a legitimate version of the package.

2. The appliance of claim 1, further comprising a network interface for interfacing with a remote user device via a wide area network to notify a user of package-content related data, such as temperature and time safety.

3. The appliance of claim 1, further comprising a charging module for configuring the energizing unit to apply charging energy to a chargeable package or device.

4. The appliance of claim 1, further comprising a preparation interface for interacting with the package intelligence and communication module during preparation of the package.

5. The appliance of claim 1, wherein the package design and package content related data includes authentication data.

6. The appliance of claim 1, wherein the package design and package content related data includes product life/expiration data.

7. The appliance of claim 1, wherein the package design and package content related data includes anti-counterfeit data.

8. The appliance of claim 1, wherein the package design and package content related data includes power profile data for energizing the contents according to a time profile.

9. The appliance of claim 1, wherein the package design and package content related data includes temperature profile data including minimum liquid temperature, maximum liquid temperature, time and temperature profiles, altitude offsets based on location.

10. The appliance of claim 1, wherein the package design and package content related data includes data related to preferred heating methods for the contents.

11. The appliance of claim 1, further comprising coils for surrounding the package during energizing to fast heat the contents.

12. The appliance of claim 1, wherein the transmitter includes an optical energy element (LED laser) and the package intelligence and communication unit includes a P-chip.

13. The appliance of claim 1, further comprising a temperature sensor on the appliance for sensing the temperature of a surface.

14. The appliance of claim 1, further comprising a control subsystem including a communications circuit for receiving package related information from a wide area network.

15. A method of using a smart appliance for heating a package, the package including a container for containing contents and a package intelligence and communication module for storing and communicating package content-related data, the smart appliance comprising an energizing unit for applying energy to the package; a package interface for interacting with the package intelligence and communication module of the package, the package interface including: a transmitter for transmitting a signal to the package intelligence and communication module of the package; and a receiver for receiving the package content related data from the package intelligence and communication module of the package; the energizing unit including a processor for controlling the energy applied to the package, the method comprising:

receiving information from the package relating to the package contents;
adjusting the energy applied to the package based on the received information;
measuring, with a sensor, a measured energy response to energy applied to the package;
authenticating the product package by comparing the measured energy response to an energy response associated with a legitimate version of the product package.

16. The method of claim 15, further comprising the step of controlling the temperature of the package contents based on predetermined characteristics.

17. The method of claim 15, further comprising the step of receiving information from an authentication server to validate a product package.

18. The method of claim 15, further comprising the step of receiving information about the package contents from a remote data storage.

19. The method of claim 15, further comprising the step of sending package related information to a user device linked to the appliance.

* * * * *